US 7,709,547 B2

(12) United States Patent
Yokoi et al.

(10) Patent No.: US 7,709,547 B2
(45) Date of Patent: May 4, 2010

(54) INK COMPOSITION, INKJET RECORDING METHOD, PRINTED MATERIAL, PRODUCTION METHOD OF A PLANOGRAPHIC PRINTING PLATE AND PLANOGRAPHIC PRINTING PLATE

(75) Inventors: Kazuhiro Yokoi, Shizuoka-ken (JP); Ippei Nakamura, Shizuoka-ken (JP); Kenji Wada, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 639 days.

(21) Appl. No.: 11/602,187

(22) Filed: Nov. 21, 2006

(65) Prior Publication Data

US 2007/0115326 A1 May 24, 2007

(30) Foreign Application Priority Data

Nov. 21, 2005 (JP) ............................. 2005-336348

(51) Int. Cl.
*C08F 2/50* (2006.01)
*C08F 2/46* (2006.01)
*C08J 3/28* (2006.01)

(52) U.S. Cl. .................... 522/31; 522/6; 522/7; 522/12; 522/15; 522/25; 522/32; 522/168; 522/170; 522/181; 106/31.13; 106/31.6

(58) Field of Classification Search ...... 522/6, 522/7, 12, 15, 25, 31, 32, 168, 170, 181; 106/31.13, 31.6
See application file for complete search history.

(56) References Cited

U.S. PATENT DOCUMENTS 6,727,036 B2 * 4/2004 Kanna et al. ............. 430/270.1
7,217,743 B2 * 5/2007 Kondo ........................ 522/81
7,309,122 B2 * 12/2007 Nakajima et al. ........... 347/100
7,399,797 B2 * 7/2008 Sasa ........................... 523/160
2006/0174799 A1 * 8/2006 Aoai ........................ 106/31.48

FOREIGN PATENT DOCUMENTS

| JP | 63-235382 A | 9/1988 |
|---|---|---|
| JP | 3-216379 A | 9/1991 |
| JP | 5-214280 A | 8/1993 |
| JP | 6-21256 B2 | 3/1994 |
| JP | 6-62905 B2 | 8/1994 |
| JP | 9-183928 A | 7/1997 |
| JP | 2003-192943 A | 7/2003 |
| JP | 2003-192944 A | 7/2003 |
| JP | 2003-312121 A | 11/2003 |
| JP | 2003-341217 A | 12/2003 |
| JP | 2004-91558 A | 3/2004 |
| JP | 2006-219539 A | 8/2006 |

OTHER PUBLICATIONS

Takahashi, E. and Shuirai, A. Novel sulfonium salts and their properties. J. Photopolymer Science and Technology 1999, v. 12, pp. 147-152.*

* cited by examiner

*Primary Examiner*—Sanza L McClendon
(74) *Attorney, Agent, or Firm*—Sughrue Mion, PLLC

(57) ABSTRACT

The present invention provides an ink composition, and inkjet recording method, a printed material, a production method of a planographic printing plate, and a planographic printing plate. The ink composition of the present invention contains a cationically polymerizable compound, a compound that generates an acid when irradiated with a radiation ray, and an onium salt compound that generates an organic acid compound having a basic nitrogen atom when irradiated with a radiation ray.

20 Claims, No Drawings

INK COMPOSITION, INKJET RECORDING METHOD, PRINTED MATERIAL, PRODUCTION METHOD OF A PLANOGRAPHIC PRINTING PLATE AND PLANOGRAPHIC PRINTING PLATE

CROSS-REFERENCE TO RELATED APPLICATION

This application claims priority under 35 USC 119 from Japanese Patent Application No. 2005-336348, the disclosure of which is incorporated by reference herein.

BACKGROUND OF THE INVENTION (i) Field of the Invention

The present invention relates to an ink composition favorably used for inkjet recording; an inkjet recording method; and a printed material using the same. Further, the present invention relates to a planographic printing plate obtained by using the ink composition and a method of producing the planographic printing plate. Specifically, the present invention relates to an ink composition suitable for inkjet recording, which can be cured with high sensitivity by irradiation of a radiation ray to form a high quality image, and is superior in storage stability and continuous ejection stability; an inkjet recording method; a printed material using the same; a planographic printing plate obtained by using the ink composition; and a method of producing the planographic printing plate.

(ii) Description of the Related Art

Image recording methods for forming an image based on image data signals on a recording medium such as paper include methods such as an electrophotographic method, a sublimation or fusion heat-transfer method, and an inkjet method. Among these, the inkjet method can be carried out using an inexpensive device, wherein the image is directly formed by ejecting ink only onto a desired image region on the recording medium, thus enabling an efficient use of ink and resulting in low running costs. In addition, the inkjet method generates little noise and is superior as an image recording method.

The inkjet method can be applied for printing not only on plain paper but also on a non-water absorptive recording medium such as a plastic sheet or a metal plate. However, higher speed and higher image quality at the time of printing are important issues, and the time period needed for drying and hardening ink droplets after ejection has a great influence on the printing efficiency and the quality of a printed image.

One of such inkjet recording methods is a method using an inkjet recording ink which is curable by irradiation with a radiation ray. In this method, printing efficiency can be improved and a sharp image can be obtained, by curing droplets by irradiating with a radiation ray immediately, or a given period of time, after the ejection.

By achieving higher sensitivity of inkjet recording ink which is curable by irradiation with a radiation ray such as an ultraviolet ray, the ink can be imparted with higher hardening properties, and thus many benefits can be obtained, such as improved inkjet recording efficiency, reduced power consumption, longer lifetime due to a reduced load on a radiation ray generator, and prevention of evaporation of low-molecular substances due to insufficient hardening. In addition, improvement in sensitivity is effective in increasing the strength of the image formed with the inkjet recording ink and, in particular, in the case of preparation of planographic printing plates, it may increase the hardness of the image region and printing durability.

Such inkjet methods using an ink composition which is curable by a radiation ray such as ultraviolet light have attracted attention recently for being relatively odorless, quick in drying, and capable of recording on a recording medium having reduced ink absorbency. Ultraviolet light curable ink compositions for inkjet recording utilizing radical polymerization have been disclosed (see, for example, Japanese Patent Application Laid-Open (JP-A) Nos. 63-235382, 3-216379, and 5-214280, and Japanese Patent Publication (JP-B) Nos. 6-21256 and 6-62905). In addition, compositions containing polymerizable compounds of specific radically polymerizable acrylates and a colorant have been proposed (see, for example, JP-A Nos. 2003-192943 and 2003-192944), for the purpose of providing an inkjet recording ink that can record an image having higher sensitivity and adhesiveness without ink bleeding, even on a recording medium on which it is normally difficult to record directly using the inkjet recording method, the ink being yet higher in stability with less skin irritation or sensitization. While such radically polymerizable inks are superior in hardening speed and can form an image without ink bleeding, they have had a disadvantage in that the adhesiveness to a recording medium deteriorates due to volume shrinkage during hardening.

Accordingly, for the purpose of improving the adhesiveness to a recording medium, cationically polymerizable ink compositions resistant to shrinkage during ultraviolet hardening have been proposed (see, for example, JP-A No. 9-183928). However, these cationically polymerizable inks have insufficient stability during storage because of the reaction of acids generated therein over time, which is a significant obstacle to commercialization of such inks. For improvement of the storage stability, methods of adding a basic compound or a thermal base-generating agent have been proposed (see, for example, JP-A Nos. 2003-312121, 2003-341217 and 2004-91558). However, a new problem has emerged in that the hardening sensitivity of the ink is lowered due to the basic compound inhibiting the function of the acid generated by light exposure. In particular, in the case of inkjet ink, there is a demand for satisfying both stability and high sensitivity, since the stability inside the head has a significant influence on ejecting properties.

Further, in the case of cationically polymerizable ink, there is a demand for preventing the acid in a polymerizing catalyst from remaining and thus causing degradation of an image or a substrate, even after formation of the image.

SUMMARY OF THE INVENTION

The present invention has been made in view of the above circumstances and provides an ink composition, and inkjet recording method, a printed material, a production method of a planographic printing plate, and a planographic printing plate.

A first aspect of the present invention provides an ink composition comprising:

(a) a cationically polymerizable compound;

(b) a compound that generates an acid when irradiated with a radiation ray; and (c) an onium salt compound that generates an organic acid compound having a basic nitrogen atom when irradiated with a radiation ray, the onium salt compound being represented by any one of the following Formulae (I), (II) and (III):

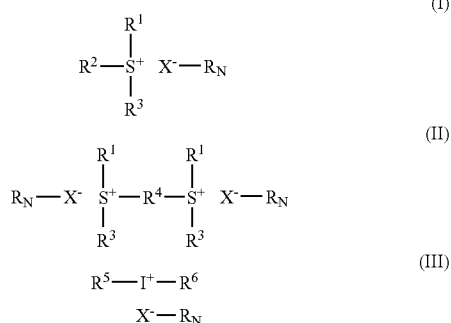

wherein, in the Formulae (I), (II) and (III), $R_N$ represents a monovalent organic group including a basic nitrogen atom or a monovalent organic group including an ammonium group; $R^1$ to $R^3$ and $R^5$ to $R^6$ each independently represent an alkyl, cycloalkyl, aralkyl, or aryl group; $R^4$ represents an alkylene, cycloalkylene, or arylene group; $X^-$ represents CO—$O^-$ or $SO_2$—$O^-$; and any two of $R^1$ to $R^3$ in Formula (I), $R^1$ and $R^3$ in Formula (II), $R^5$ and $R^6$ in Formula (III) may bond with each other to form a ring.

A second aspect of the present invention provides an inkjet recording method comprising:

ejecting the ink composition of the first aspect onto a recording medium; and curing the ejected ink composition by irradiation with a radiation ray.

A third aspect of the present invention provides a printed material that is recorded by the method of the second aspect of the present invention.

A fourth aspect of the present invention provides a production method of a planographic printing plate comprising:

ejecting the ink composition of the first aspect onto a hydrophilic substrate; and curing the ejected ink composition by irradiation with a radiation ray to form a hydrophobic image composed of the cured ink composition on the hydrophilic substrate.

A fifth aspect of the present invention provides a planographic printing plate obtained by the production method of a planographic printing plate of the fourth aspect.

DETAILED DESCRIPTION OF THE INVENTION

The ink composition according to the invention is curable by irradiation with a radiation ray and comprises (a) a cationically polymerizable compound, (b) a compound that generates an acid when irradiated with a radiation ray (a photo-acid generator), and (c) an onium salt compound that generates an organic acid compound having a basic nitrogen atom in molecule when irradiated with a radiation ray, and if desired, (d) a colorant may further be added.

The term "radiation ray" in the present invention indicates any active radiation ray without any limitation, as long as it generates polymerization initiating radical in the ink composition, upon irradiation, and examples thereof include α-ray, γ-ray, X-ray, ultraviolet light, visible light, electron beam, and the like. Among them, ultraviolet light and electron beam are preferable, wherein ultraviolet light is particularly preferable, from the viewpoint of curing sensitivity and availability of equipment. Thus, the ink composition according to the present invention is preferably an ink composition which is curable by irradiation with an ultraviolet light as a radiation ray.

Examples of the source of radiation ray for the compound (c) include room light such as fluorescent light and sunlight with which the ink composition is irradiated over time, in a printed material.

In the following, respective constituent components used in the ink composition of the present invention will be described.

[(c) Onium Salt Compound Represented by Formula (I), (II) or (III) and Generates Organic Acid Compound having Basic Nitrogen Atom by Irradiation]

First, (c) an onium salt compound that is a characteristic component used in the invention and represented by (c) a formula (I), (II) or (III) and generates an organic acid compound having a basic nitrogen atom by irradiation (hereinafter, referred to as a specific compound (c), as appropriate) will be described. The specific compound (c) is represented by the formula (I), (II) or (III), and wherein, at an initial stage, a basic nitrogen atom acts as a base to exhibit basicity. However, when a radiation ray is irradiated and the compound (c) is decomposed, there is generated an amphoteric compound having a basic nitrogen atom and an organic acid site, which neutralizes in the molecule to reduce the basicity of the compound, as compared with the compound in the initial state.

Compounds having such characteristics are disclosed in, for instance, Japanese Patent No. 3577743 and Japanese Patent Application Laid-Open (JP-A) Nos. 2001-215689 and 2001-166476. However, the inventors newly found that the above-mentioned objects can be achieved, by using the ink composition of the present invention. Radiation rays to irradiate are not particularly restricted, as long as they can impart energy that can decompose the specific compound (c). Examples of radiation rays include UV-rays, visible rays and electron beams, and room light such as a fluorescent lamp or sunlight may also be included.

The specific compound (c) is an onium salt compound that is represented by a formula (I), formula (II) or formula (III) described below and develops basicity due to a basic nitrogen atom in $R_N$. On the other hand, when the compound is decomposed by irradiation, an anion site having a basic nitrogen atom and an organic acid site, that is, [$X^-$—$R_N$], more specifically [CO—$O^-$—$R_N$] or [$SO_2$—$O^-$—$R_N$], emits [HX—$R_N$] as an acid, then causes disappearance of the basicity due to the basic nitrogen atom in $R_N$ as an intramolecular salt, therefore the compound is neutralized as a whole.

Also, it is considered that since there is a basic nitrogen atom in a polar compound, the affinity with a polar initiator is high, and, in comparison with an amine that does not lose basicity for its low polarity, the compound can efficiently capture acid in a system, thus the stability is high. By imparting a polar group such as a hydroxyl group into the molecule of the specific compound (c), stability may further be improved.

By including the specific compound (c) in the ink composition, the ink composition becomes excellent in storage stability because of the basicity thereof. Accordingly, when a slight amount of undesirable acid is generated from the compound (b) that generates an acid under irradiation as described later, by white illumination at the time of being handled under or by reflected light during curing exposure, the acid is neutralized to inhibit the curing reaction. When sufficient exposure is performed to cure the ink composition, the ink composition is rapidly decomposed to lower the basicity, therefore the function of maintaining storage stability without lowering curing sensitivity can be achieved.

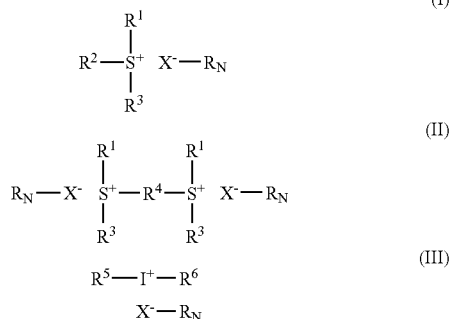

In Formulae, $R^1$ to $R^3$ and $R^5$ to $R^6$ each independently represent an alkyl group, a cycloalkyl group, an aralkyl group or an aryl group, and $R^4$ represents an alkylene group, a cycloalkylene group or an arylene group. $X^-$ represents $CO-O^-$ or $SO_2-O^-$. Among these, in view of stability, $SO_2-O^-$ is more preferred. Here, any two of $R^1$ to $R^3$ in Formula (I), $R^1$ and $R^3$ in Formula (II), and $R^5$ and $R^6$ in Formula (III) may bond with each other to form a ring.

First, compounds represented by Formulae (I) and (II) will be described. In Formulae (I) and (II), $R^1$ to $R^3$ each independently represent an alkyl group, a cycloalkyl group, an aralkyl group or an aryl group, which may further have a substituent group. Any two of $R^1$ to $R^3$ may bond with each other to form a ring.

As $R^1$ to $R^3$, a cycloalkyl group and an aryl group are preferably cited and the aryl group is more preferably cited.

When $R^1$ to $R^3$ represent an aryl group, a substituent group may be introduced therein, such as an alkyl group of straight chain, branched-chain and cyclic type, an alkoxy group of straight chain, branched-chain or cyclic type, a hydroxyl group, a halogen atom, and $-S-R^0$ wherein $R^0$ represents an alkyl group of straight, branched or cyclic type or an aryl group having 6 to 14 carbon atoms such as a phenyl group, a tolyl group, a methoxyphenyl group, and a naphthyl group. Among these, a substituent group in which an electron attracting substituent group such as a halogen is introduced in an aryl group is preferable, for example, trichlorophenyl sulfonium.

Examples of the alkyl group include ones having 1 to 4 carbon atoms such as a methyl group, an ethyl group, a propyl group, an n-butyl group, a sec-butyl group and a t-butyl group. Examples of the cyclic alkyl group include ones having 3 to 8 carbon atoms such as a cyclopropyl group, a cyclopentyl group and a cyclohexyl group.

Examples of the alkoxy group include ones having 1 to 4 carbon atoms such as a methoxy group, an ethoxy group, a hydroxyethoxy group, a propoxy group, an n-butoxy group, an iso-butoxy group, a sec-butoxy group and a t-butoxy group. Examples of the halogen atom include a fluorine atom, a chlorine atom, a bromine atom and an iodine atom.

The substituent groups may further have a substituent group such as an alkoxy group having 1 to 4 carbon atoms, a halogen atom (fluorine atom, chlorine atom and iodine atom), an aryl group having 6 to 10 carbon atoms, an alkenyl group having 2 to 6 carbon atoms, a cyano group, a hydroxy group, a carboxy group, an alkoxycarbonyl group, and a nitro group.

$R^4$ represents a bivalent linkage group selected from an alkylene group, a cycloalkylene group and an arylene group, wherein the arylene group is preferred. The alkylene group, cycloalkylene group and arylene group may also have a substituent group, and the same substituent groups as described in the explanation of $R^1$ to $R^3$ can be introduced.

Examples of [$R_N$] include basic compound residual groups such as a residual group of an aliphatic compound having a substituted or non-substituted amino group (hereinafter, referred to as [nitrogen-containing aliphatic compound]); a residual group of a heterocyclic compound having at least one nitrogen atom in the ring (hereinafter, referred to as [nitrogen-containing heterocyclic compound]); and a residual group of an aromatic compound having at lest one of a substituted or non-substituted amino group, a residual group of the nitrogen-containing aliphatic compound or a residual group of the nitrogen-containing heterocyclic compound (hereinafter, referred to as [nitrogen-containing aromatic compound]).

Examples of the nitrogen-containing aliphatic compound include alkyl amine, dialkyl amine or trialkyl amine where each of alkyl groups has 1 to 20 carbon atoms; and cycloalkyl amine, dicycloalkyl amine or tricycloalkyl amine where each of cycloalkyl groups has 3 to 20 carbon atoms.

Examples of the nitrogen-containing heterocyclic compound include ethyleneimine, piperazine, triethylenediamine (1,4-diazabicyclo[2,2,2]octane), pyrrole, pyrazole, imidazole, oxazole, thiazole, thiadiazole, pyridazine, pyrimidine, pyrazine, oxazine, morphorine, triazine, indole, oxyindole, isoindole, indolizine, indazole, benzimidazole, benzothiazole, benzofurazan, purine, quinoline, isoquinoline, sinoline, quinazoline, quinoxazoline, acridine, carbazole, carboline, benzoquinoline, acridone and substitution derivatives thereof.

Furthermore, examples of the aromatic compound in the nitrogen-containing aromatic compounds include benzene, naphthalene, anthracene, acenaphthalene, acenaphten, fluorene, anthraquinone, phenanthrene, coumarin, benzopyran, phenoxanthene flavin, pyrene, benzanthracene, benzochrysene and substitution derivatives thereof.

Examples of the substitution amino group in the nitrogen-containing aliphatic compound or the nitrogen-containing aromatic compound include an alkylamino group, a dialkylamino group, an aralkylamino group, a diaralkylalkyl group, an arylamino group, a diarylamino group and a sulfonamino group.

In the following, specific examples of such substitution amino group will be cited. Examples of the alkylamino group include ones in which an alkyl group has 1 to 6 carbon atoms, such as a methylamino group, an ethylamino group, an n-propylamino group, an isopropylamino group, an n-butylamino group, an isobutylamino group, a sec-butylamino group, a t-butylamino group, an n-penthylamino group, an n-hexylamino group, and a cyclohexylamino group.

Examples of the dialkylamino group include ones in which an alkyl group has 1 to 6 carbon atoms, such as a dimethylamino group, a diethylamino group, a di-n-propylamino group, a diisopropylamino group, a di-n-butylamino group, a diisobutylamino group, a di-sec-butylamino group, a di-t-butylamino group, a di-n-pentylamino group, a di-n hexylamino group, a dicyclohexylamino group, a methylethylamino group, a methyl-n-propylamino group, a methylisopropylamino group, a methyl-n-butylamino group, a methylisobutylamino group, a methyl-sec-butylamino group, a methyl-t-butylamino group, a methyl-n-pentylamino group, a methyl-n-hexylamino group, a methylcyclohexylamino group, an ethyl-n-propylamino group, an ethylisopropylamino group, an ethyl-n-butylamino group, an ethylisobutylamino group, an ethyl-sec-butylamino group, an ethyl-t-butylamino group, an ethyl-n-pentylamino group, an ethyl-n-hexylamino group and an ethylcyclohexylamino group.

Examples of the aralkylamino group include ones in which an alkyl group having 1 to 6 carbon atoms is substituted by an aryl group having 6 to 16 carbon atoms, such as a benzylamino group, a (diphenylmethyl)amino group, a (triphenylmethyl)amino group, a (methylphenylmethyl)amino group, a (dimethylphenylmethyl)amino group, a (naphthylmethyl)amino group, and a (phenylcyclohexyl)amino group.

Examples of the diaralkylamino group include ones in which an alkyl group having 1 to 6 carbon atoms is substituted by an aryl group having 6 to 16 carbon atoms, a dibenzylamino group, a di(diphenylmethyl)amino group, a di(triphenylmethyl)amino group, a di(methylphenylmethyl)amino group and a di(dimethylphenylmethyl)amino group.

Examples of the diarylamino group include ones in which each aryl group has 6 to 16 carbon atoms, such as a diphenylamino group, a dinaphtylamino group, a diacenaphthalenylamino group, a dipyrenylamino group and a phenylnaphthylamino group.

Examples of the sulfonamino group include a benzenesulfonamino group, a p-toluenesulfonamino group, a naphthalenesulfonamino group and a pyrenesulfonamino group.

Specific examples of such nitrogen-containing aromatic compound include aniline, N,N-dimethylaniline, N-phenylaniline, N-phenyl-N-methylaniline, 1-aminonaphthalene, 2-aminonaphthalene, N-phenylaminonaphthalene, 1-aminoanthracene, 1-aminopyrene, 7-amino-4-methylcoumarin, 2-amino-3-bromofluorene, 9-dimethylaminophenanthrene, 1-aminoanthraquinone, 6-amino-5,6-benzocoumarin, aminobenzophenone, N-tosylaniline, N,N-diphenylsulfoaniline, N-naphthalenesulfoaniline and N-benzylaniline.

Among these nitrogen-containing aromatic compounds, aniline, N,N-dimethylaniline, N-phenylaniline, N-phenylaminonaphthalene and N-tosylaniline are preferable.

Further, $R^5$ and $R^6$ in Formula (III) each independently represent an alkyl group, a cycloalkyl group, an aralkyl group or an aryl group, wherein the aryl group is preferred. Examples of these groups include the same ones as $R^1$ to $R^3$ in Formula (I). $R^5$ and $R^6$ may also have a substituent group, and examples thereof include substituent groups that can be introduced in $R^1$ to $R^3$ in the formula (I) can be cited.

$X^-$ and $R_N$ indicate the same as that in Formulas (I) and (II).

Specific examples of the onium salt compound represented by Formula (I), (II) or (III) include the exemplary compounds (c-1) to (c-44) listed below. However, the invention is not limited thereto.

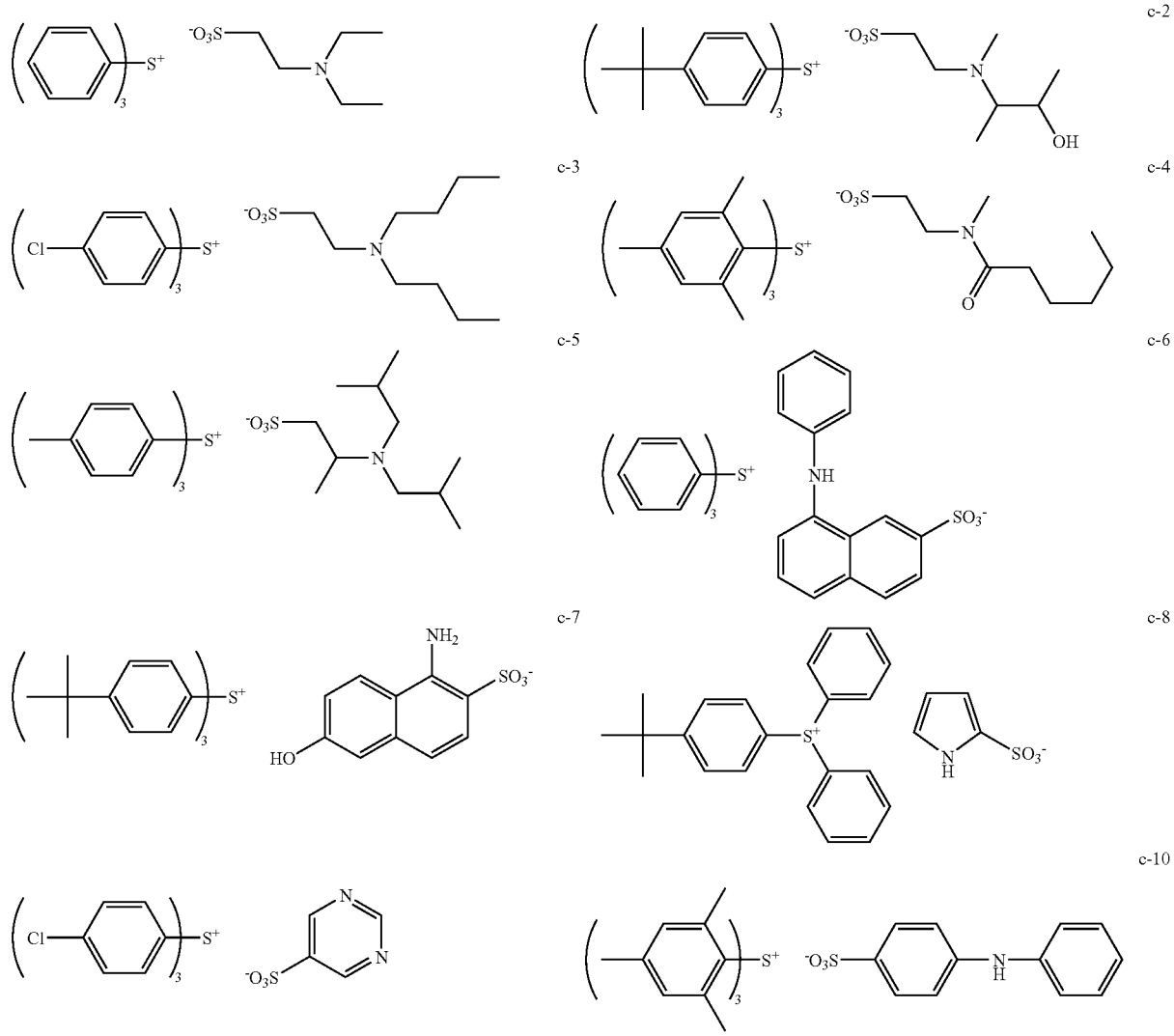

-continued
c-11
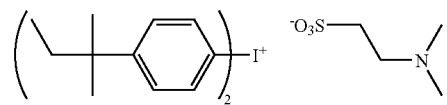
c-12
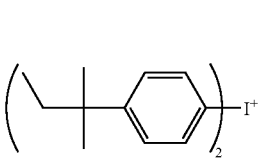
c-13
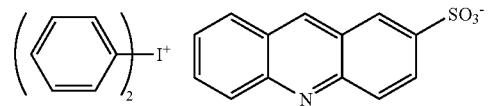
c-14
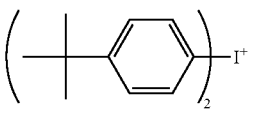
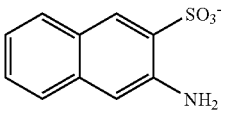
c-15
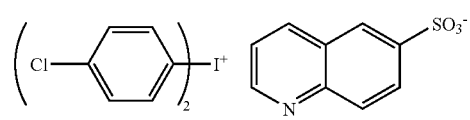
c-16
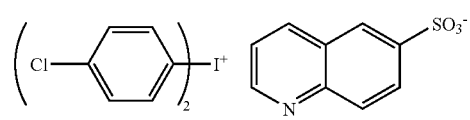
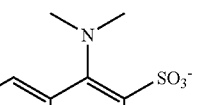
c-17
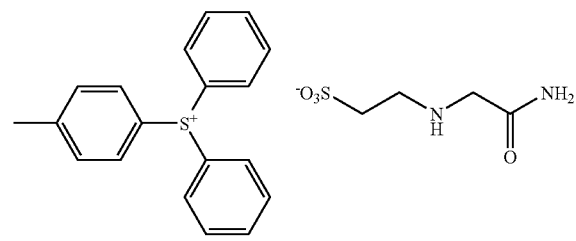
c-18
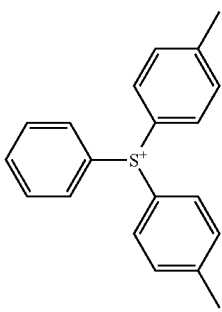
c-19
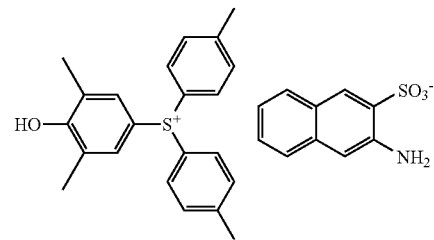
c-20
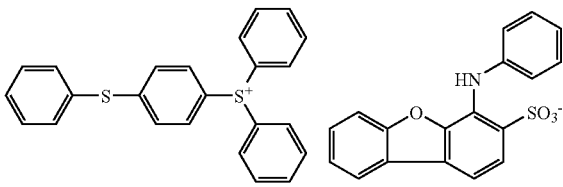
c-21
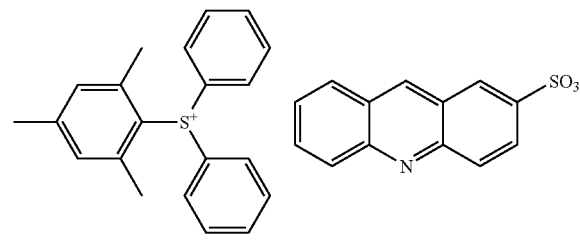
c-22
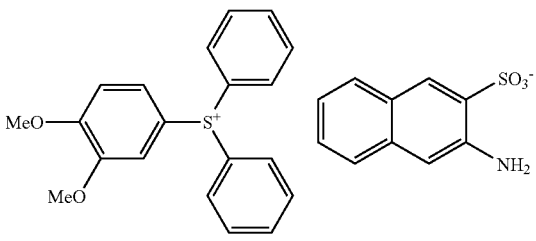
c-23
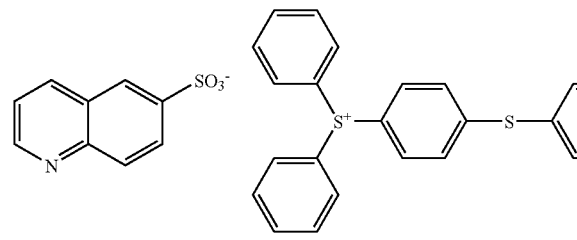
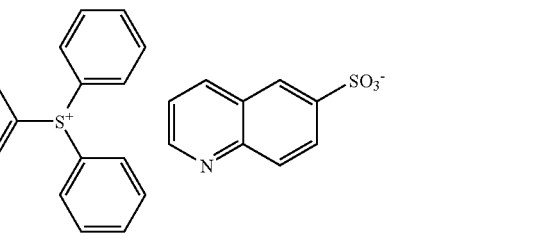

-continued
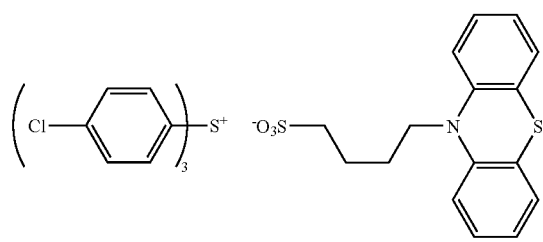
c-24
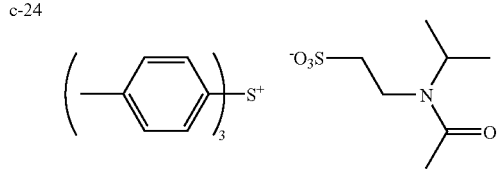
c-25
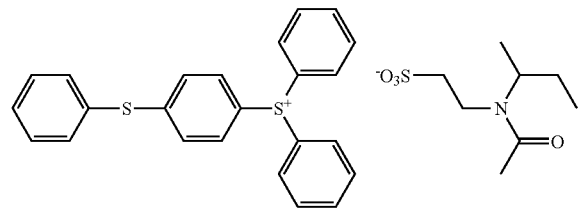
c-26
c-27
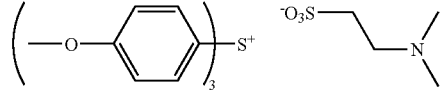
c-28
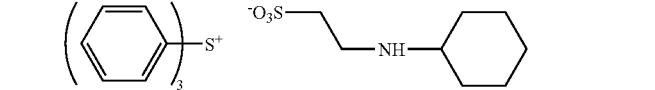
c-29
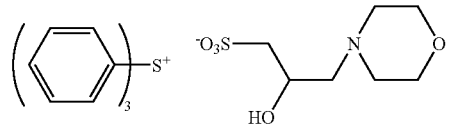
c-30
c-31
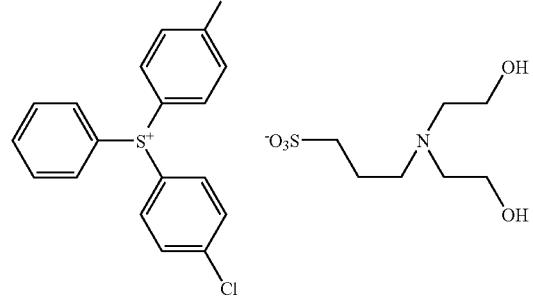
c-32
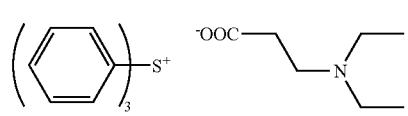
c-34
c-33
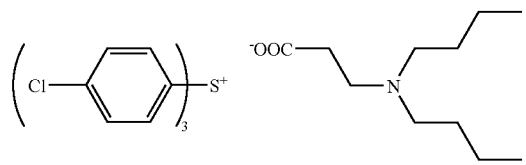
c-36
c-35
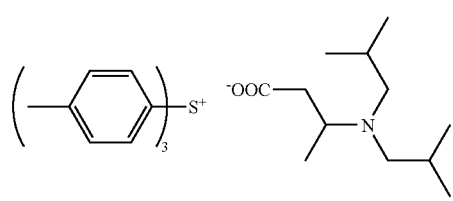
c-38
c-37
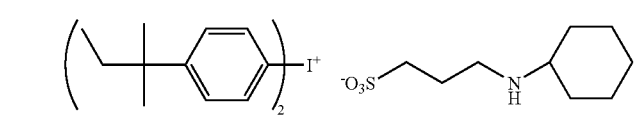
c-39

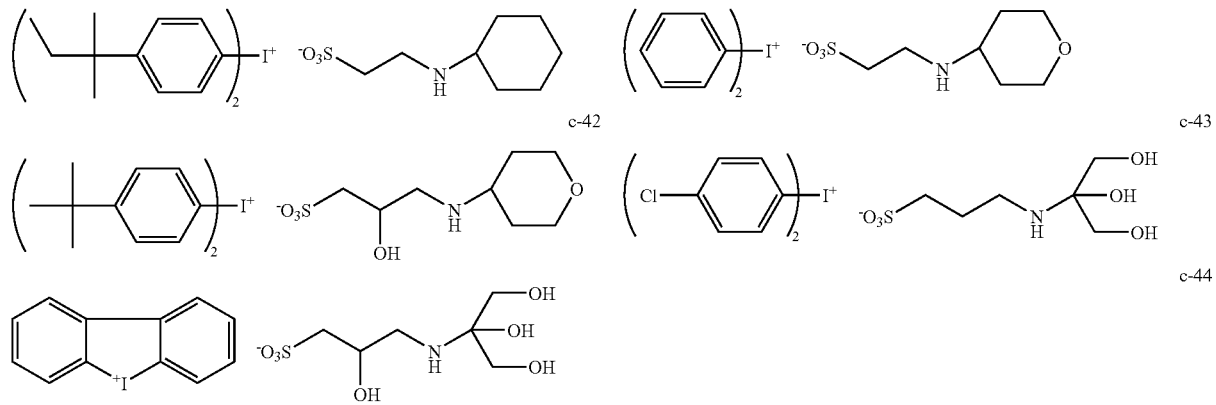

The specific compound (c) can be used alone or in combination of two or more.

The content of the specific compound (c) in proportion to the total solid content of the ink composition of the invention is appropriately in the range of 0.01 to 15% by weight, preferably in the range of 0.03 to 10% by weight and more preferably in the range of 0.1 to 5% by weight, from the viewpoint of maintaining curing sensitivity and satisfying both storage stability and ejection stability. The solid content in the ink composition of the invention means the component in the ink composition from which volatile components such as solvents to be described below are removed.

[(a) Cationically Polymerizable Compound]

The cationically polymerizable compound (a) used in the invention is not particularly limited, as long as it is curable in the polymerization reaction initiated by the acid generated from a photo-acid generator (b) to be described later, and any one of various cationically polymerizable monomers known as photocationically polymerizable monomers may be used. Examples of the cationically polymerizable monomers include epoxy, vinyl ether, and oxetane compounds described in JP-A Nos. 6-9714, 2001-31892, 2001-40068, 2001-55507, 2001-310938, 2001-310937, 2001-220526.

The epoxy compound is, for example, an aromatic epoxide, an alicyclic epoxide or the like. Examples of the aromatic epoxide include a di- or poly-glycidyl ether prepared by reacting a polyvalent phenol having at least one aromatic nucleus or an alkylene oxide adduct thereof with an epichlorohydrin, such as di- or poly-glycidyl ethers of bisphenol A or an alkylene oxide adduct thereof, di- or poly-glycidyl ethers of hydrogenated bisphenol A or an alkylene oxide adduct thereof, and novolak epoxy resins. Examples of the alkylene oxides here include ethylene oxide and propylene oxide.

Preferable examples of the alicyclic epoxide include a cyclohexene oxide- or cyclopentene oxide-containing compound, which is prepared by epoxidizing a compound having at least one cycloalkane ring such as cyclohexene or cyclopentene with a suitable oxidizing agent such as hydrogen peroxide or peracid.

The aliphatic epoxide may be, for example, a di- or poly-glycidyl ether of an aliphatic polyvalent alcohol or the alkylene oxide adduct thereof, and examples thereof include alkylene glycol diglycidyl ethers such as ethylene glycol diglycidyl ether, propylene glycol diglycidyl ether, and 1,6-hexanediol diglycidyl ether; polyvalent alcohol polyglycidyl ethers such as di- or tri-glycidyl ether of glycerin or an alkylene oxide adduct thereof; polyalkylene glycol diglycidyl ethers such as diglycidyl ethers of polyethylene glycol or an alkylene oxide adduct thereof and diglycidyl ethers of polypropylene glycol or an alkylene oxide adduct thereof; and the like. The alkylene oxides are, for example, ethylene oxide, propylene oxide, and the like.

Examples of the monofunctional epoxy compounds used in the invention include phenyl glycidyl ether, p-tert-butylphenyl glycidyl ether, butyl glycidyl ether, 2-ethylhexyl glycidyl ether, allyl glycidyl ether, 1,2-butylene oxide, 1,3-butadiene monoxide, 1,2-epoxide decane, epichlorohydrin, 1,2-epoxydecane, styrene oxide, cyclohexene oxide, 3-methacryloyloxymethylcylcohexene oxide, 3-acryloyloxymethyl-cylcohexene oxide, 3-vinylcyclohexene oxide and the like.

Examples of the multifunctional epoxy compounds include bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolak resins, hydrogenated bisphenol A diglycidyl ether, hydrogenated bisphenol F diglycidyl ether, hydrogenated bisphenol S diglycidyl ether, 3,4-epoxycyclohexylmethyl-3',4'-epoxycyclohexanecarboxylate, 2-(3,4-epoxycyclohexyl-5,5-spiro-3,4-epoxy)cyclohexane-meta-dioxane, bis(3,4-epoxycyclohexylmethyl)adipate, vinylcyclohexene oxide, 4-vinylepoxycyclohexane, bis(3,4-epoxy-6-methylcyclohexylmethyl)adipate, 3,4-epoxy-6-methylcyclohexyl-3',4'-epoxy-6'-methylcyclohexanecarboxylate, methylene-bis(3,4-epoxycyclohexane), dicyclopentadiene diepoxide, ethylene glycol di(3,4-epoxycyclohexylmethyl)ether, ethylene bis(3,4-epoxycyclohexanecarboxylate), dioctyl epoxyhexahydrophthalate, di-2-ethylhexyl epoxyhexahydrophthalate, 1,4-butanediol diglycidyl ether, 1,6-hexanediol diglycidyl ether, glycerin triglycidyl ether, trimethylolpropane triglycidyl ether, polyethylene glycol diglycidyl ether, polypropylene glycol diglycidyl ethers, 1,1,3-tetradecadiene dioxide, limonene dioxide, 1,2,7,8-diepoxyoctane, 1,2,5,6-diepoxycyclooctane, and the like.

Among these epoxy compounds, aromatic and alicyclic epoxides are preferable and alicyclic epoxides are particularly preferable, from the viewpoint of curing speed.

Examples of the vinyl ether compounds include di- or tri-vinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, and trimethylolpropane trivinyl ether; mono-vinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropylether-o-propylene carbonate, dodecyl vinyl ether, diethylene glycol monovinyl ether, and octadecyl vinyl ether; and the like.

Examples of the monofunctional vinyl ethers include methyl vinyl ether, ethyl vinyl ether, propyl vinyl ether, n-butyl vinyl ether, t-butyl vinyl ether, 2-ethylhexyl vinyl ether, n-nonyl vinyl ether, lauryl vinyl ether, cyclohexyl vinyl ether, cyclohexylmethyl vinyl ether, 4-methylcyclohexylmethyl vinyl ether, benzyl vinyl ether, dicyclopentenyl vinyl ether, 2-dicyclopentenoxyethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxypolyethylene glycol vinyl ether, tetrahydrofurfuryl vinyl ether, 2-hydroxyethyl vinyl ether, 2-hydroxypropyl vinyl ether, 4-hydroxy butyl vinyl ether, 4-hydroxymethylcyclohexylmethyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, phenoxypolyethylene glycol vinyl ether and the like.

Examples of the multifunctional vinyl ethers include divinyl ethers such as ethylene glycol divinyl ether, diethylene glycol divinyl ether, polyethylene glycol divinyl ether, propylene glycol divinyl ether, butylene glycol divinyl ether, hexanediol divinyl ether, bisphenol A alkylene oxide divinyl ethers, and bisphenol F alkylene oxide divinyl ethers; multifunctional vinyl ethers such as trimethylolethane trivinyl ether, trimethylolpropane trivinyl ether, ditrimethylolpropane tetravinyl ether, glycerol trivinyl ether, pentaerythritol tetravinyl ether, dipentaerythritol pentavinyl ether, dipentaerythritol hexavinyl ether, ethylene oxide adducts of trimethylolpropane trivinyl ether, propylene oxide adducts of trimethylolpropane trivinyl ether, ethylene oxide adducts of ditrimethylolpropane tetravinyl ether, propylene oxide adducts of ditrimethylolpropane tetravinyl ether, ethylene oxide adducts of pentaerythritol tetravinyl ether, propylene oxide adducts of pentaerythritol tetravinyl ether, ethylene oxide adducts of dipentaerythritol hexavinyl ether, and propylene oxide adducts of dipentaerythritol hexavinyl ether; and the like.

The vinyl ether compound is preferably a di- or tri-vinyl ether compound and particularly preferably a divinyl ether compound, from the viewpoint of curability, adhesiveness to the recording medium, and surface hardness of the formed image.

The oxetane compound according to the invention is a compound having an oxetane ring compound, and any one of known oxetane compounds, for example those described in JP-A Nos. 2001-220526, 2001-310937, and 2003-341217 may be used.

The compound having an oxetane ring used in the ink composition of the present invention is preferably a compound having one to four oxetane rings in its structure. By using such a compound, viscosity of the ink composition may be effectively controlled in the range at which adhesiveness between the hardened ink and the recording medium is favorable in terms of handling.

Examples of the compounds having one or two oxetane rings in the molecule include the compounds represented by the following Formulae (1) to (3), and the like.

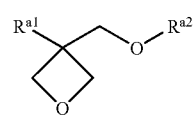

(1)

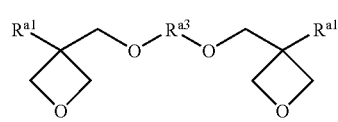

(2)

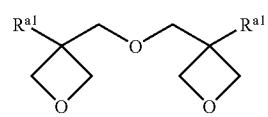

(3)

In Formulae (1) to (3), $R^{a1}$ represents a hydrogen atom, an alkyl group having 1 to 6 carbon atoms, a fluoroalkyl group having 1 to 6 carbon atoms, an allyl group, an aryl group, a furyl group or a thienyl group. When there are two of $R^{a1}$ in the molecule, they may be the same or different from each other.

Examples of the alkyl group include methyl group, ethyl group, propyl group and butyl group, or the like; and examples of the fluoroalkyl group include the above alkyl groups in which any one of hydrogen atoms is substituted with a fluorine atom.

$R^{a2}$ represents a hydrogen atom, an alkyl group having 1 to 6 carbon atoms, an alkenyl group having 2 to 6 carbon atoms, a group having an aromatic ring, an alkylcarbonyl group having 2 to 6 carbon atoms, an alkoxycarbonyl group having 2 to 6 carbon atoms, or an N-alkylcarbamoyl group having 2 to 6 carbon atoms. Examples of the alkyl groups include methyl, ethyl, propyl, and butyl groups and the like; examples of the alkenyl groups include 1-propenyl, 2-propenyl, 2-methyl-1-propenyl, 2-methyl-2-propenyl, 1-butenyl, 2-butenyl, and 3-butenyl groups and the like; and examples of the groups having an aromatic ring include phenyl, benzyl, fluorobenzyl, methoxybenzyl, and phenoxyethyl groups and the like. Examples of the alkylcarbonyl groups include ethylcarbonyl, propylcarbonyl, and butylcarbonyl groups and the like; examples of the alkoxycarbonyl groups include ethoxycarbonyl, propoxycarbonyl, and butoxycarbonyl groups and the like; and examples of the N-alkylcarbamoyl groups include ethylcarbamoyl, propylcarbamoyl, butylcarbamoyl, and pentylcarbamoyl groups and the like.

$R^{a3}$ represents a linear or branched alkylene group, a linear or branched poly(alkyleneoxy) group, a linear or branched unsaturated hydrocarbon group, a carbonyl group or a carbonyl group-containing alkylene group, a carboxyl group-containing alkylene group, a carbamoyl group-containing alkylene group, or the groups shown below. The alkylene groups are, for example, ethylene, propylene, and butylene groups; the poly(alkyleneoxy) groups are, for example, poly(ethyleneoxy) and poly(propyleneoxy) groups and the like. The unsaturated hydrocarbon groups are, for example, propenylene, methylpropenylene, and butenylene groups and the like.

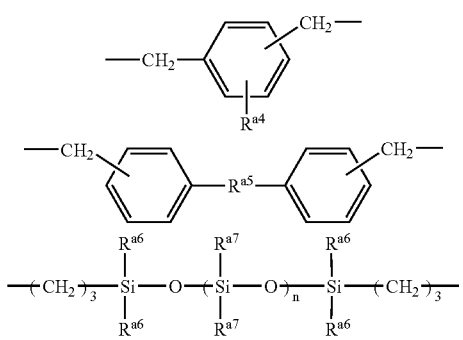

When $R^{a3}$ is one of the polyvalent groups above, $R^{a4}$ represents a hydrogen atom, an alkyl group having 1 to 4 carbon atoms, an alkoxy group having 1 to 4 carbon atoms, a halogen atom, a nitro group, a cyano group, a mercapto group, a lower alkylcarboxyl group, a carboxyl group, or a carbamoyl group.

$R^{a5}$ represents an oxygen or sulfur atom, a methylene group, NH, SO, $SO_2$, $C(CF_3)_2$, or $C(CH_3)_2$.

$R^{a6}$ represents an alkyl group having 1 to 4 carbon atoms or an aryl group; and n is an integer of 0 to 2,000. $R^{a7}$ represents an alkyl group having 1 to 4 carbon atoms, an aryl group, or a monovalent group having the structure shown below. In the following Formula, $R^{a8}$ is an alkyl group having 1 to 4 carbon atoms or an aryl group; and m is an integer of 0 to 100.

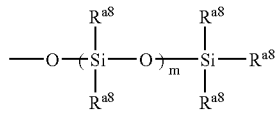

Examples of the compounds having three or four oxetane rings include the compounds represented by the following Formula (4).

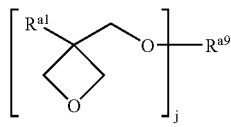

(4)

In Formula (4), $R^{a1}$ is the same definition as that in Formula (1) above. Examples of $R^{a9}$, a polyvalent connecting group, include a branched alkylene group having 1 to 12 carbon atoms such as the group represented by the following Formula A, B, or C, a branched poly(alkyleneoxy) group such as the group represented by the following Formula D, a branched polysiloxy group represented by the following Formula E, or the like. j is 3 or 4.

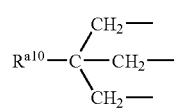

A

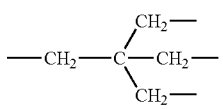

B

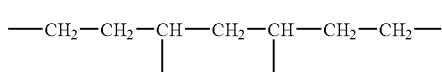

C

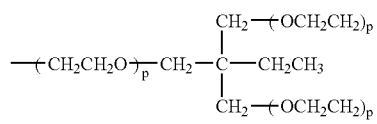

D

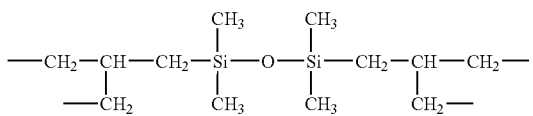

E

In Formula A, $R^{a10}$ represents a methyl, ethyl or propyl group, and in Formula D, p is an integer of 1 to 10.

Other examples of the oxetane compounds favorably used in the present invention include the compounds having oxetane rings on the side chains represented by the following Formula (5).

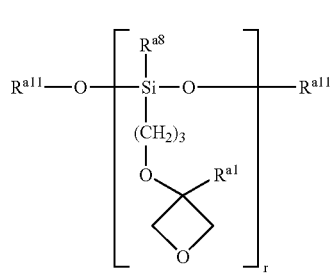

(5)

In Formula (5), $R^{a8}$ is the same definition as that in the Formula above. $R^{a11}$ represents an alkyl group having 1 to 4 carbon atoms, such as methyl, ethyl, propyl or butyl, or a trialkylsilyl group; and r is 1 to 4.

Such compounds having oxetane rings are described specifically in JP-A No. 2003-341217, paragraph [0021] to [0084], and the compounds described therein can be used favorably in the invention.

Among the oxetane compounds used in the present invention, a compound having one oxetane ring is preferable, from the viewpoint of viscosity and tackiness of the ink-composition.

The ink composition according to the invention may contain only one, or two or more of these cationically polymerizable compounds, but it is preferable to use at least one compound selected from the oxetane and epoxy compounds and a vinyl ether compound in combination, from the viewpoint of effectively preventing shrinkage during curing of ink.

The content of the cationically polymerizable compound (a) in the ink composition is appropriately in the range of 10 to 95 wt %, preferably 30 to 90 wt %, and still more preferably 50 to 85 wt %, in proportion to the total solid content of the composition.

[(b) Compound that Generates Acid by Irradiation with Radiation Ray]

The ink composition according to the present invention contains a compound that generates an acid when irradiated with a radiation ray (a photo-acid generator). The photo-acid generator that can be used in the present invention include the compounds such as a photocationically polymerizable photoinitiator, a photoradically polymerizable photoinitiator, a photodecolorant to colorants, a photoalterant, or a compound that generates an acid when irradiated with light such as the light used for microresist (ultraviolet light at a wavelength of 400 to 200 nm, far ultraviolet ray, particularly preferably, g-ray, h-ray, i-ray, or KrF excimer laser beam), ArF excimer laser beam, electron beam, X-ray, molecular or ion beam, or the like.

Examples of the photo-acid generators include the compounds which are decomposed generate an acid when irradiated with a radiation ray, such as onium salt compounds such as diazonium salts, phosphonium salts, sulfonium salts, and iodonium salts, sulfonate compounds such as imidosulfonates, oximesulfonates, diazodisulfones, disulfones, and o-nitrobenzylsulfonates, and the like.

Other examples of the compounds that generate an acid when irradiated with a radiation ray or other activated light used in the present invention include the diazonium salts described in S. I. Schlesinger, Photogr. Sci. Eng., 18, 387 (1974), T. S. Bal et al., Polymer, 21, 423 (1980), and others; the ammonium salts described in U.S. Pat. Nos. 4,069,055, 4,069,056, and U.S. Reissue No. 27,992, JP-A No. 3-140,140, and others; the phosphonium salts described in D. C. Necker et al., Macromolecules, 17, 2468 (1984), C. S. Wen et al., Teh, Proc. Conf. Rad. Curing ASIA, p. 478 Tokyo, October (1988), U.S. Pat. Nos. 4,069,055 and 4,069,056, and others; the iodonium salts described in J. V. Crivello et al., Macromolecules, 10(6), 1307 (1977), Chem. & Eng. News, Nov. 28, p. 31 (1988), EP Nos. 104,143, 339,049, and 410,201, JP-A Nos. 2-150848 and 2-296514, and others;

the sulfonium salts described in J. V. Crivello et al., Polymer J. 17, 73 (1985), J. V. Crivello et al., J. Org. Chem., 43, 3055 (1978), W. R. Watt et al., J. Polymer Sci., Polymer Chem. Ed., 22, 1789 (1984), J. V. Crivello et al., Polymer Bull., 14, 279 (1985), J. V. Crivello et al, Macromolecules, 14(5), 1141 (1981), J. V. Crivello et al., J. Polymer Sci., Polymer Chem. Ed., 17, 2877 (1979), EP Nos. 370,693, 161, 811, 410,201, 339,049, 233,567, 297,443, and 297,442, U.S. Pat. Nos. 3,902,114, 4,933,377, 4,760,013, 4,734,444, and 2,833,827, German Patent Nos. 2,904,626, 3,604,580, and 3,604,581, JP-A Nos. 7-28237 and 8-27102, and others;

the selenonium salts described in J. V. Crivello et al., Macromolecules, 10(6), 1307 (1977), J. V Crivello et al., J. Polymer Sci., Polymer Chem. Ed., 17, 1047 (1979), and others;

the onium salts such as arsonium salts described in C. S. Wen et al., Teh, Proc. Conf. Rad. Curing ASIA, p. 478 Tokyo, October (1988), and others; the organic halogen compounds described in U.S. Pat. No. 3,905,815, JP-B No. 46-4605, JP-A Nos. 48-36281, 55-32070, 60-239736, 61-169835, 61-169837, 62-58241, 62-212401, 63-70243, and 63-298339, and others; the organic metals/organic halides described in K. Meier et al., J. Rad. Curing, 13(4), 26 (1986), T. P. Gill et al., Inorg. Chem., 19, 3007 (1980), D. Astruc, Acc. Chem. Res., 19 (12), 377 (1896), JP-A No. 2-161445, and others;

the photo-acid generators containing an O-nitrobenzyl protecting group described in S. Hayase et al., J. Polymer Sci., 25, 753 (1987), E. Reichmanis et al., J. Polymer Sci., Polymer Chem. Ed., 23, 1 (1985), Q. Q. Zhu et al., J. Photochem., 36, 85, 39, 317 (1987), B. Amit et al., Tetrahedron Lett., (24) 2205 (1973), D. H. R. Barton et al., J. Chem. Soc., 3571 (1965), P. M. Collins et al., J. Chem. Soc., Perkin I, 1695 (1975), M. Rudinstein et al., Tetrahedron Lett., (17), 1445 (1975), J. W. Walker et al., J. Am. Chem. Soc., 110, 7170 (1988), S. C. Busman et al., J. Imaging Technol., 11(4), 191 (1985), H. M. Houlihan et al., Macromolecules, 21, 2001 (1988), P. M. Collins et al., J. Chem. Soc., Chem. Commun., 532 (1972), S. Hayase et al., Macromolecules, 18, 1799 (1985), E. Reichmanis et al., J. Electrochem. Soc., Solid State Sci. Technol., 130 (6), F. M. Houlihan et al., Macromolecules, 21, 2001 (1988), EP Nos. 0290,750, 046,083, 156,535, 271,851, and 0,388,343, U.S. Pat. Nos. 3,901,710 and 4,181,531, JP-A Nos. 60-198538 and 53-133022, and others; and the sulfonic compounds that photodecompose to generate an acid such as iminosulfonates described in M. Tunooka et al., Polymer Preprints Japan, 35 (8), G. Berner et al., J. Rad. Curing, 13 (4), W. J. Mijs et al., Coating Technol., 55 (697), 45 (1983), Akzo, H. Adachi et al., Polymer Preprints Japan, 37(3), EP Nos. 0199,672, 84515, 044,115, 618,564, and 0101,122, U.S. Pat. Nos. 4,371,605 and 4,431,774, JP-A Nos. 64-18143, 2-245756, and 3-140109, and others; the disulfonated compounds described in JP-A Nos. 61-166544 and 2-71270, and others; and the diazoketosulfone and diazodisulfonated compounds described in JP-A Nos. 3-103854, 3-103856, and 4-210960 and others.

In addition, compounds having a group generating acid by the light described above or polymers having such a compound in the main chain or on the side chain including those described in M. E. Woodhouse et al., J. Am. Chem. Soc., 104, 5586 (1982), S. P. Pappas et al., J. Imaging Sci., 30 (5), 218 (1986), S. Kondo et al., Macromol. Chem., Rapid Commun., 9, 625 (1988), Y Yamada et al., Macromol. Chem., 152, 153, 163 (1972), J. V. Crivello et al., J. Polymer Sci., Polymer Chem. Ed., 17, 3845 (1979), U.S. Pat. No. 3,849,137, German Patent No. 3914407, JP-A Nos. 63-26653, 55-164824, 62-69263, 63-146038, 63-163452, 62-153853, and 63-146029, and others, may also be used. Examples thereof include onium salts such as diazonium salts, ammonium salts, phosphonium salts, iodonium salts, sulfonium salts, selenonium salts, and arsonium salts; organic halogen compounds, organic metals/organic halides, o-nitrobenzyl protecting group-containing photo-acid generators, sulfonic compounds that generates an acid by photochemical decomposition such as iminosulfonates, disulfonated compounds, diazoketosulfones, and diazodisulfonated compounds.

The compounds that generate an acid by light described in V. N. R. Pillai, Synthesis, (1), 1 (1980), A. Abad et al., Tetrahedron Lett., (47) 4555 (1971), D. H. R. Barton et al., J. Chem. Soc., (C), 329 (1970), U.S. Pat. No. 3,779,778, EP No. 126,712, and others may also be used.

Favorable examples of the photo-acid generators to be used in the invention include the compounds represented by the following Formulae (b1), (b2), and (b3).

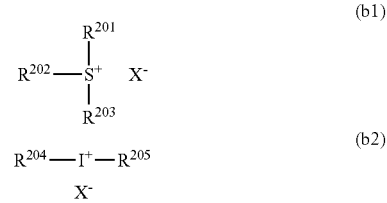

$$R^{206}-\underset{\underset{O}{\|}}{\overset{\overset{O}{\|}}{S}}-\underset{\underset{}{}}{\overset{\overset{N_2}{}}{}}-\underset{\underset{O}{\|}}{\overset{\overset{O}{\|}}{S}}-R^{207} \quad (b3)$$

In Formula (b1), $R^{201}$, $R^{202}$ and $R^{203}$ each independently represent an organic group. $X^-$ represents a non-nucleophilic anion, and is preferably a sulfonate anion, carboxylate anion, bis(alkylsulfonyl)amide anion, tris(alkylsulfonyl)methide anion, $BF_4^-$, $PF_6^-$, $SbF_6^-$ or a group shown below, preferably an organic anion having one or more carbon atoms.

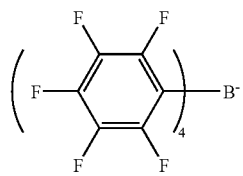

Favorable organic anions include the organic anions shown in the following Formulae.

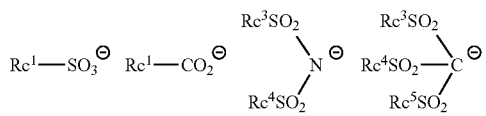

$Rc^1$ represents an organic group.

The organic group as $Rc^1$ is, for example, a group having 1 to 30 carbon atoms, and preferably an alkyl group, a cycloalkyl group, an aryl group, or a group wherein two or more of these groups are bound to each other via a connecting group such as single bond, —O—, —CO$_2$—, —S—, —SO$_3$—, or —SO$_2$N(Rd$^1$)-.

Rd$^1$ represents a hydrogen atom or an alkyl group.

$Rc^3$, $Rc^4$, and $Rc^5$ each independently represent an organic group.

The organic group as $Rc^3$, $Rc^4$, or $Rc^5$ is preferably the same as the organic group favorable as $Rc^1$ and particularly preferably a perfluoroalkyl group having 1 to 4 carbon atoms.

$Rc^3$ and $Rc^4$ may bond to each other to form a ring.

The group formed by as $Rc^3$ and $Rc^4$ bonding to each other is, for example, an alkylene group or an arylene group, preferably a perfluoroalkylene group having 2 to 4 carbon atoms.

The organic group as $Rc^1$ or $Rc^3$ to $Rc^5$ is most preferably an alkyl group in which the hydrogen atom at 1 position is replaced with a fluorine atom or a fluoroalkyl group or a phenyl group substituted with a fluorine atom or a fluoroalkyl group. By containing a fluorine atom or a fluoroalkyl group, acidity of the acid generated by irradiation with light may be increased, thus improving sensitivity.

The organic group as $R^{201}$, $R^{202}$ or $R^{203}$ is generally a group having 1 to 30 carbon atoms, preferably 1 to 20 carbon atoms, and two groups of $R^{201}$ to $R^{203}$ may bond to each other to form a ring structure, which may contain an oxygen or sulfur atom or an ester, amide or carbonyl group.

The group formed by two of the groups $R^{201}$ to $R^{203}$ being bonded with each other is, for example, an alkylene group (e.g., butylene or pentylene).

Examples of the organic groups $R^{201}$, $R^{202}$ and $R^{203}$ include the groups corresponding to the compounds (b1-1), (b1-2), and (b1-3) described below.

The photo-acid generator may be a compound having multiple groups in the structure represented by Formula (b1). For example, it may be a compound having a structure wherein at least one of $R^{201}$ to $R^{203}$ in the compound represented by Formula (b1) is bonded directly, or via a connecting group, to at least one of $R^{201}$ to $R^{203}$ in the other compound represented by Formula (b1).

Still more preferable components (b 1) include the compounds (b1-1), (b 1-2), and (b1-3) described below.

The compound (b1-1) is an arylsulfonium compound wherein at least one of $R^{201}$ to $R^{203}$ in Formula (b1) above is an aryl group, i.e., a compound having an arylsulfonium ion as its cation.

All of $R^{201}$ to $R^{203}$ in the arylsulfonium compound may be aryl groups; or alternatively, a part of $R^{201}$ to $R^{203}$ may be aryl groups while the rest is an alkyl or cycloalkyl group.

Examples of the arylsulfonium compounds include triarylsulfonium compounds, diarylalkylsulfonium compounds, aryldialkylsulfonium compounds, diarylcycloalkylsulfonium compounds, aryldicycloalkylsulfonium compounds, and the like.

The aryl group in the arylsulfonium compounds is preferably an aryl group such as phenyl or naphthyl, or a heteroaryl group such as indole or pyrrole residues, and more preferably a phenyl or indole residue. When the arylsulfonium compound has two or more aryl groups, the two or more aryl groups may be the same as or different from each other.

The alkyl group that the arylsulfonium compound may have as needed is preferably a linear or branched alkyl group having 1 to 15 carbon atoms, and examples thereof include methyl, ethyl, propyl, n-butyl, sec-butyl, and t-butyl groups and the like.

The cycloalkyl group that the arylsulfonium compound may have as needed is preferably a cycloalkyl group having 3 to 15 carbon atoms, and examples thereof include cyclopropyl, cyclobutyl, and cyclohexyl groups, and the like.

The aryl, alkyl, or cycloalkyl group as $R^{201}$ to $R^{203}$ may have an alkyl group (e.g., 1 to 15 carbon atoms), a cycloalkyl group (e.g., 3 to 15 carbon atoms), an aryl group (e.g., 6 to 14 carbon atoms), an alkoxy group (e.g., 1 to 15 carbon atoms), a halogen atom, a hydroxyl group, or a phenylthio group, as the substituent group. Preferable examples of the substituent groups include linear or branched alkyl groups having 1 to 12 carbon atoms, cycloalkyl groups having 3 to 12 carbon atoms, and linear, branched or cyclic alkoxy groups having 1 to 12 carbon atoms; and most preferable are alkyl groups having 1 to 4 carbon atoms and alkoxy groups having 1 to 4 carbon atoms. All or any one of the three of $R^{201}$ to $R^{203}$ may have a substituent group. In addition, when any one of $R^{201}$ to $R^{203}$ is an aryl group, the substituent group is preferably substituted at the p-position in the aryl group.

Hereinafter, the compound (b1-2) will be described.

The compound (b1-2) is a compound represented by Formula (b1), wherein $R^{201}$ to $R^{203}$ each independently represent an organic group that does not contain an aromatic ring. The aromatic rings cited here include the aromatic rings containing a heteroatom.

The non-aromatic ring-containing organic group as $R^{201}$ to $R^{203}$ generally has 1 to 30 carbon atoms and preferably 1 to 20 carbon atoms.

$R^{201}$ to $R^{203}$ each independently, preferably, represent an alkyl, cycloalkyl, allyl, or vinyl group, more preferably a linear, branched, or cyclic 2-oxoalkyl group or an alkoxycarbonylmethyl group, and particularly preferably a linear or branched 2-oxoalkyl group.

The alkyl group as $R^{201}$ to $R^{203}$ may be a straight-chain or branched group, preferably a linear or branched alkyl group having 1 to 10 carbon atoms (e.g., methyl, ethyl, propyl, butyl, or pentyl group), and more preferably a linear or branched 2-oxoalkyl group or an alkoxycarbonylmethyl group.

The cycloalkyl group as $R^{201}$ to $R^{203}$ is preferably, for example, a cycloalkyl group having 3 to 10 carbon atoms (e.g., cyclopentyl, cyclohexyl, or norbornyl group); and a cyclic 2-oxoalkyl group is more preferable.

Favorable examples of the linear, branched, and cyclic 2-oxoalkyl groups of $R^{201}$ to $R^{203}$ include the alkyl and cycloalkyl groups described above having >C=O at the 2 position.

The alkoxy group in the alkoxycarbonylmethyl group of $R^{201}$ to $R^{203}$ is preferably, for example, an alkoxy group having 1 to 5 carbon atoms (e.g., methoxy, ethoxy, propoxy, butoxy, or pentoxy group).

$R^{201}$ to $R^{203}$ may be substituted with a halogen atom, an alkoxy group (e.g., 1 to 5 carbon atoms), a hydroxyl group, a cyano group, or a nitro group additionally.

The compound (b1-3) is a compound represented by the following Formula (b1-3), i.e., a compound having a phenacyl sulfonium salt structure.

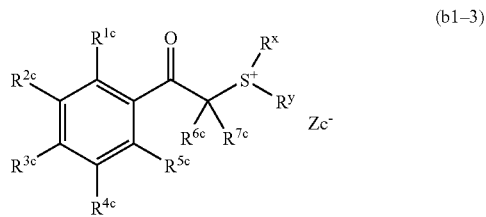

(b1-3)

In Formula (b1-3), $R^{1c}$ to $R^{5c}$ each independently represent a hydrogen or halogen atom, or an alkyl, cycloalkyl, or alkoxy group.

$R^{6c}$ and $R^{7c}$ each independently represent a hydrogen atom or an alkyl or cycloalkyl group.

$R^x$ and $R^y$ each independently represent an alkyl, cycloalkyl, allyl, or vinyl group.

Any two or more of $R^{1c}$ to $R^{5c}$, $R^{6c}$ and $R^{7c}$, or $R^x$ and $R^y$ may bond to each other to form a ring structure.

Zc⁻ represents a non-nucleophilic anion, and is the same as the non-nucleophilic anion X⁻ in Formula (b1).

The alkyl group as $R^{1c}$ to $R^{7c}$ may be a straight-chain or branching group, and examples thereof include linear or branched alkyl groups having 1 to 20 carbon atoms, preferably having 1 to 12 carbon atoms, (e.g., methyl, ethyl, linear or branched propyl, linear or branched butyl, and linear or branched pentyl group).

The cycloalkyl group as $R^{1c}$ to $R^{7c}$ is preferably, for example, a cycloalkyl group having 3 to 8 carbon atoms (e.g., cyclopentyl or cyclohexyl group).

The alkoxy group as $R^{1c}$ to $R^{5c}$ may be a linear, branched or cyclic group, and examples thereof include alkoxy groups having 1 to 10 carbon atoms, preferably linear and branching alkoxy groups having 1 to 5 carbon atoms (e.g., methoxy, ethoxy, linear or branched propoxy, linear or branched butoxy, and linear or branched pentoxy group), and cyclic alkoxy groups having 3 to 8 carbon atoms (e.g., cyclopentyloxy and cyclohexyloxy group).

Examples of the groups formed by bonding any two or more of $R^{1c}$ to $R^{5c}$, $R^{6c}$ and $^{7c}$, or $R^x$ and $R^y$ include butylene and pentylene groups. The ring structure may contain an oxygen or sulfur atom or an ester or amide bond.

Preferably, part of the $R^{1c}$ to $R^{5c}$ are linear or branched alkyl groups, cycloalkyl groups, or linear, branched, or cyclic alkoxy groups; and more preferably, the total number of carbon atoms in groups $R^{1c}$ to $R^{5c}$ is 2 to 15. As a result, solubility in a solvent can be improved, thus generation of particles during storage can be suppressed.

The alkyl and cycloalkyl groups of $R^x$ and $R^y$ include the same as those for the alkyl and cycloalkyl groups as $R^{1c}$ to $R^{7c}$.

Each of $R^x$ and $R^y$ is preferably a 2-oxoalkyl or alkoxycarbonylmethyl group.

The 2-oxoalkyl group is, for example, the same as those for the alkyl or cycloalkyl group having a >C=O group at the 2 position of $R^{1c}$ to $R^{5c}$.

Examples of the alkoxy group in the alkoxycarbonylmethyl group are the same as those for the alkoxy group of $R^{1c}$ to $R^{5c}$.

Each of $R^x$ and $R^y$ is preferably an alkyl or cycloalkyl group having 4 or more carbon atoms, more preferably the alkyl or cycloalkyl group having 6 or more carbon atoms and still more preferably 8 or more carbon atoms.

In Formula (b2) and (b3), $R^{204}$ to $R^{207}$ each independently represent an aryl, alkyl or cycloalkyl group. X⁻ represents a non-nucleophilic anion, and is the same as the non-nucleophilic anion X⁻ in Formula (b1).

The aryl group in $R^{204}$ to $R^{207}$ is preferably a phenyl or naphthyl group and more preferably a phenyl group.

The alkyl group in $R^{204}$ to $R^{207}$ may be a linear or branched group, and is preferably, a linear or branched alkyl group having 1 to 10 carbon atoms (e.g., methyl, ethyl, propyl, butyl, or pentyl group). The cycloalkyl group in $R^{204}$ to $R^{207}$ is preferably, for example, a cycloalkyl group having 3 to 10 carbon atoms (e.g., cyclopentyl, cyclohexyl, or norbornyl group).

Examples of the substituent groups that $R^{204}$ to $R^{207}$ may have include alkyl groups (e.g., 1 to 15 carbon atoms), cycloalkyl groups (e.g., 3 to 15 carbon atoms), aryl groups (e.g., 6 to 15 carbon atoms), alkoxy groups (e.g., 1 to 15 carbon atoms), a halogen atom, a hydroxyl group, a phenylthio group, and the like.

Other usable examples of the compounds that generate an acid when irradiated with an activated light or a radiation ray include the compounds represented by the following Formulae (b4), (b5), and (b6).

$$Ar^3-SO_2-SO_2-Ar^4 \quad (b4)$$

$$R^{206}-SO_2O-N\diagup_{A}^{O}\diagdown_{O} \quad (b5)$$

$$\underset{R^{208}}{\overset{N}{\diagdown}}\underset{R^{207}}{\overset{O-SO_2-R^{206}}{\diagup}} \quad (b6)$$

In Formulae (b4) to (b6), $Ar^3$ and $Ar^4$ each independently represent an aryl group.

$R^{206}$, $R^{207}$ and $R^{208}$ each independently represent an alkyl, cycloalkyl or aryl group. A represents an alkylene, alkenylene or arylene group.

Among the photo-acid generators mentioned above, preferable ones are the compounds represented by Formulae (b1) to (b3) and the like.
Favorable examples of the photo-acid generators (b) to be used in the invention include compounds (b-1) to (b-96), as listed below, but the invention is not limited thereto.
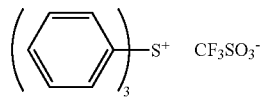 (b-1)
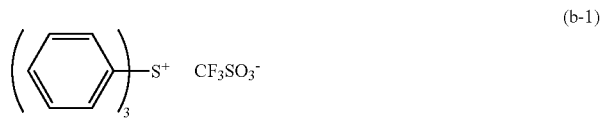 (b-2)
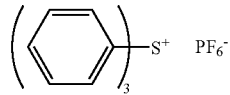 (b-3)
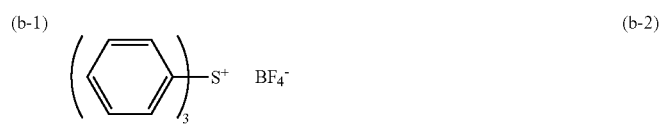 (b-4)
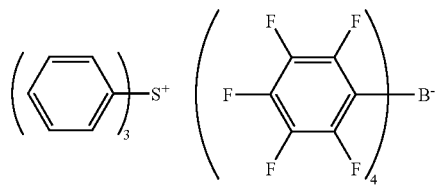 (b-5)
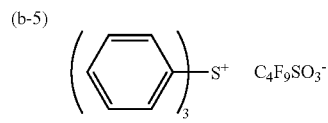 (b-6)
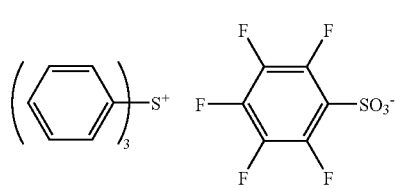 (b-7)
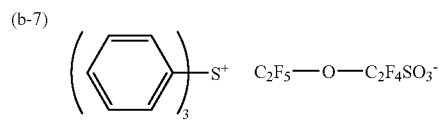 (b-8)
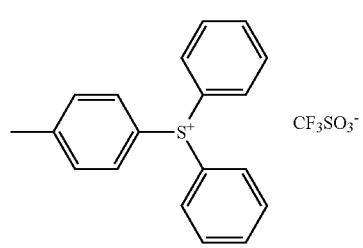 (b-9)
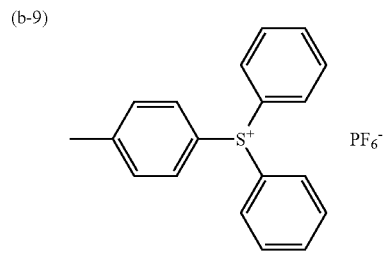 (b-10)
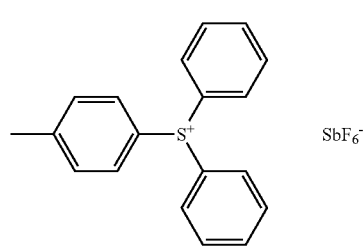 (b-11)
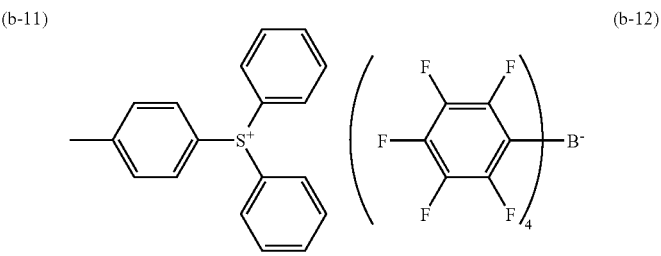 (b-12)
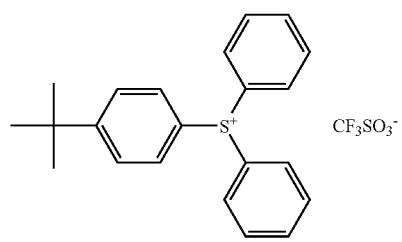 (b-13)
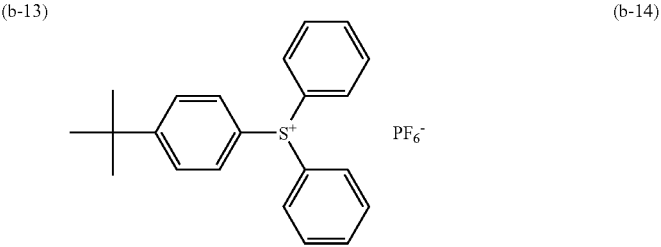 (b-14)

-continued
(b-15)
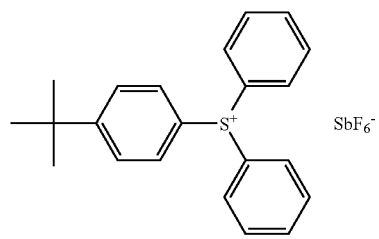
(b-16)
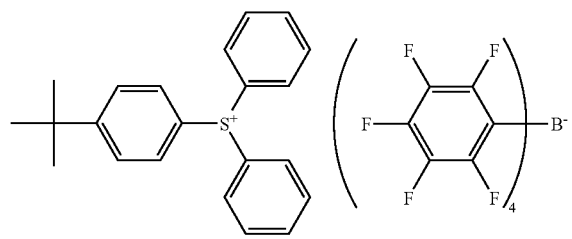
(b-17)
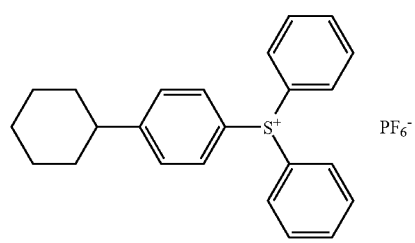
(b-18)
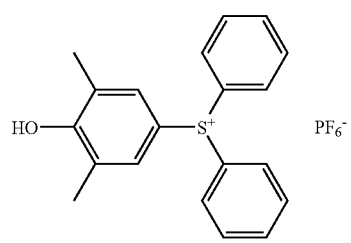
(b-19)
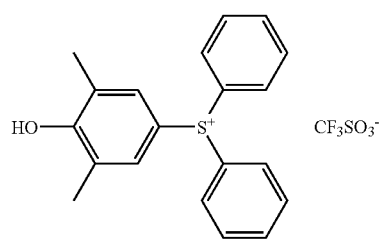
(b-20)
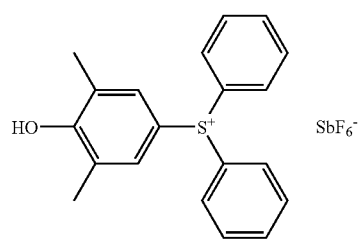
(b-21)
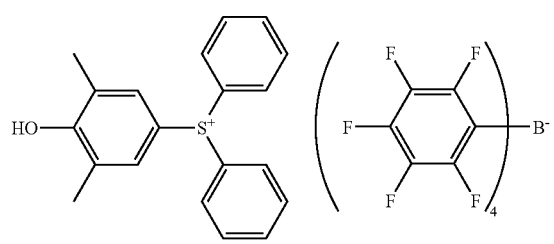
(b-22)
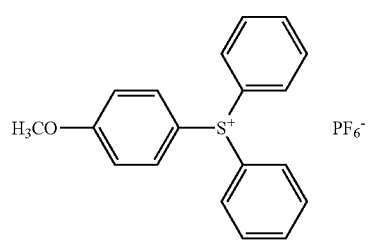
(b-23)
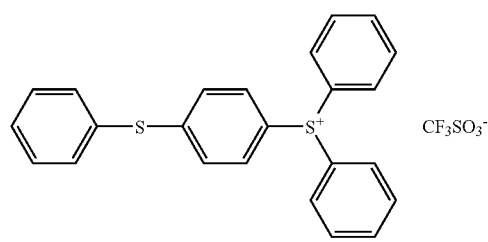
(b-24)
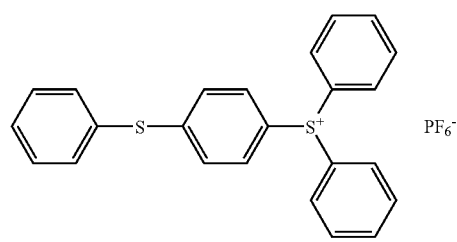
(b-25)
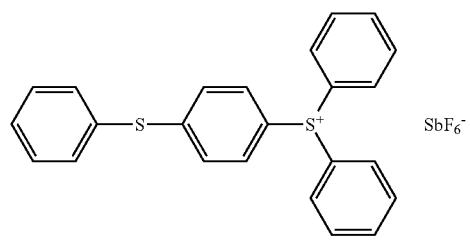
(b-26)
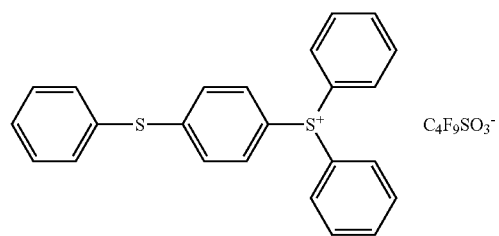

-continued
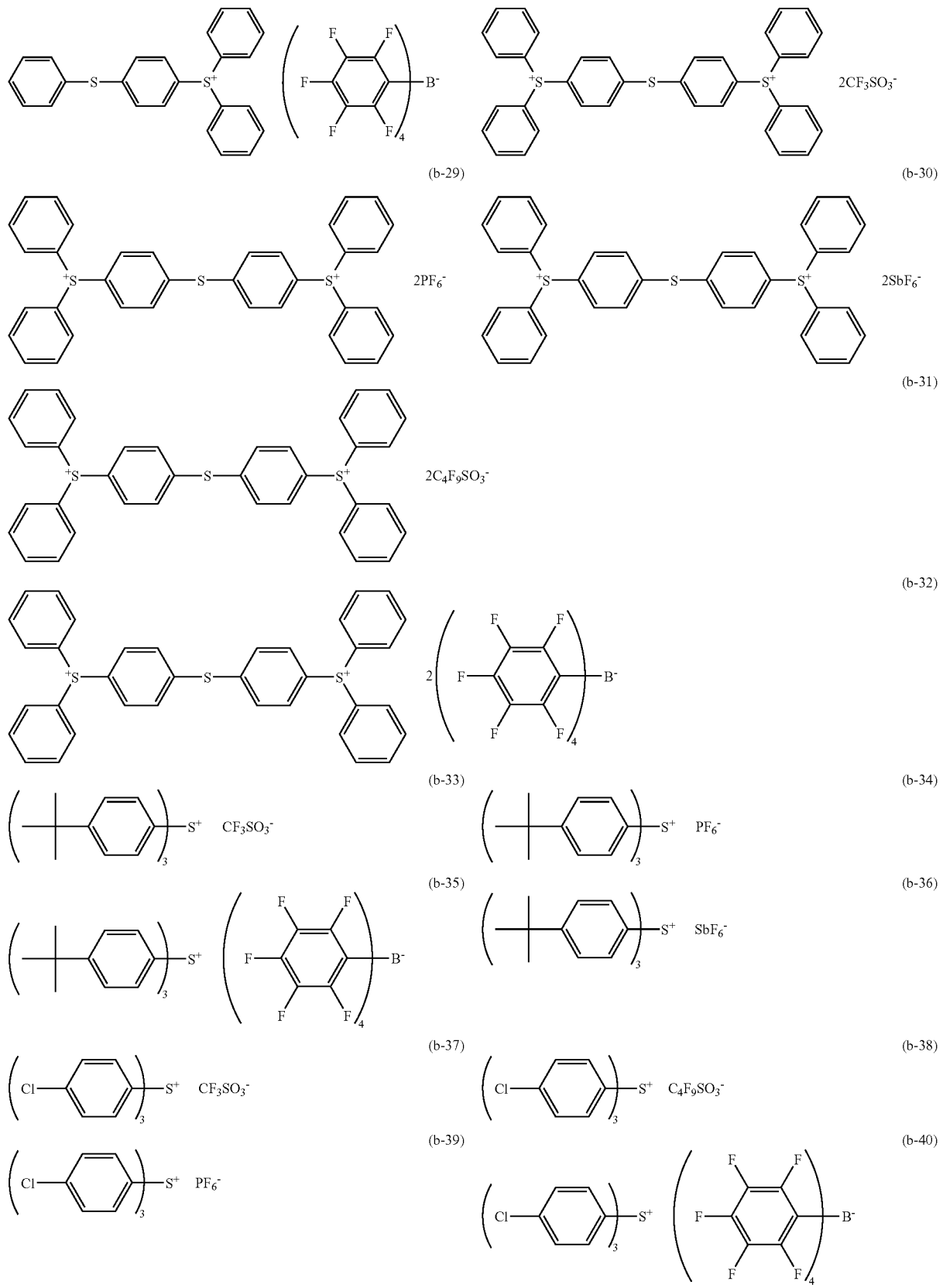

-continued
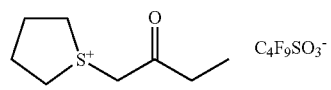 (b-41)
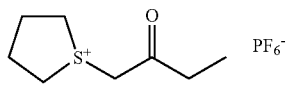 (b-42)
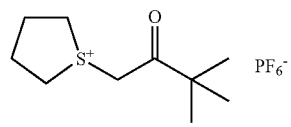 (b-43)
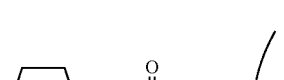 (b-44)
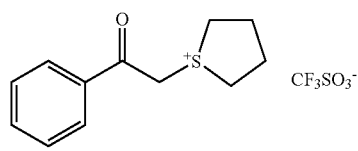 (b-45)
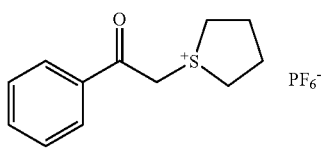 (b-46)
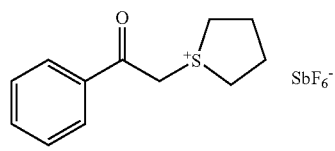 (b-47)
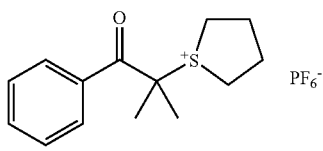 (b-48)
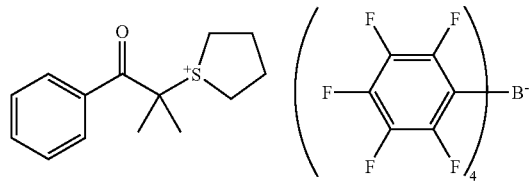 (b-49)
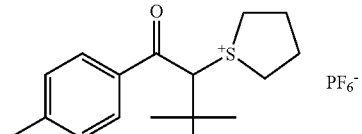 (b-50)
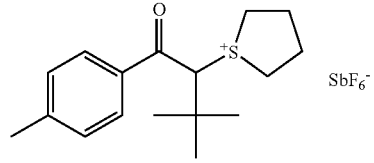 (b-51)
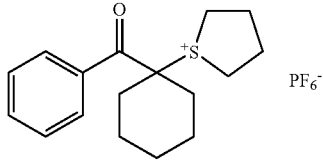 (b-52)
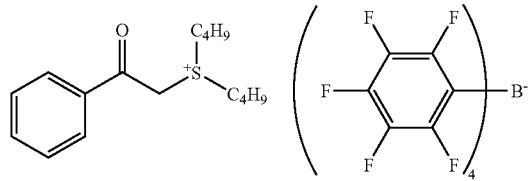 (b-53)
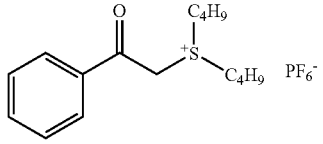 (b-54)
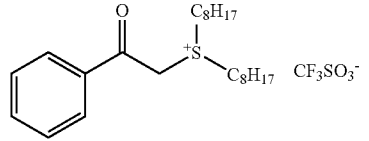 (b-55)
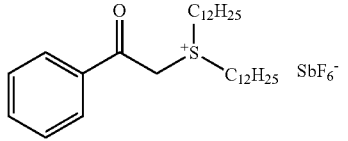 (b-56)
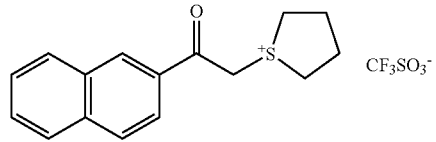 (b-57)
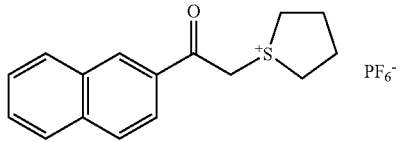 (b-58)

-continued
(b-59)
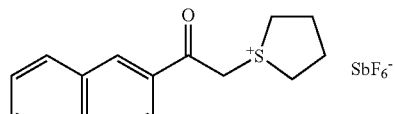
(b-60)
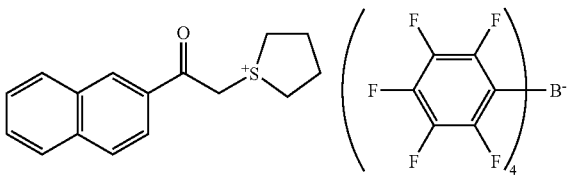
(b-61)
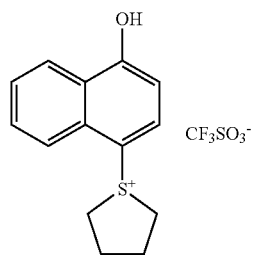
(b-62)
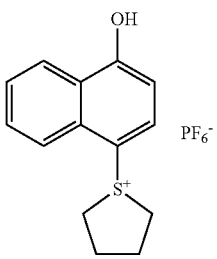
(b-63)
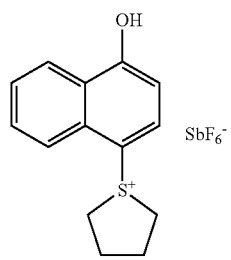
(b-64)
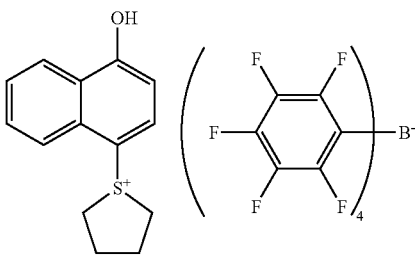
(b-65)
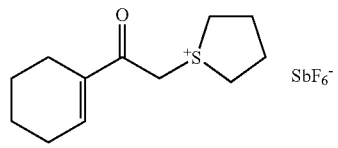
(b-66)
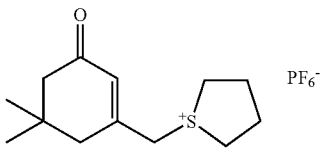
(b-67)
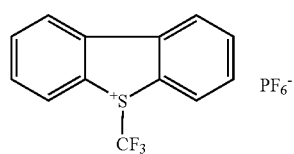
(b-68)
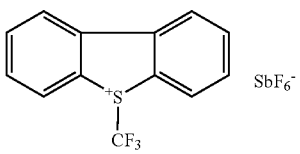
(b-69)
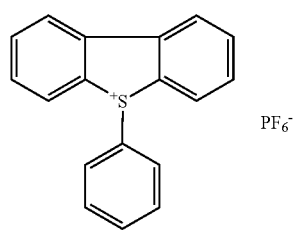
(b-70)
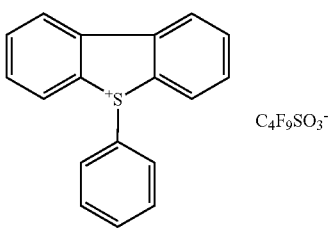
(b-71)
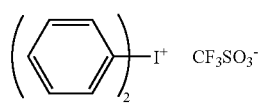
(b-72)
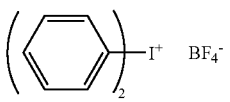
(b-73)
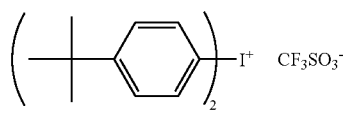
(b-74)
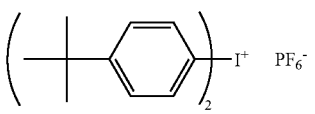

-continued
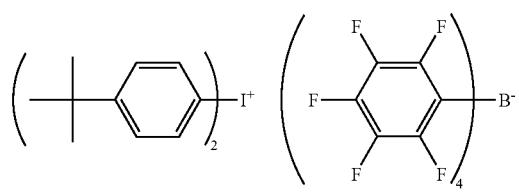 (b-75)
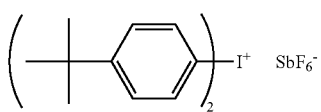 (b-76)
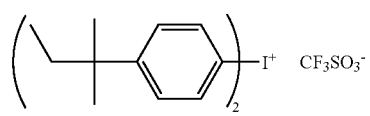 (b-77)
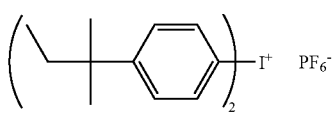 (b-78)
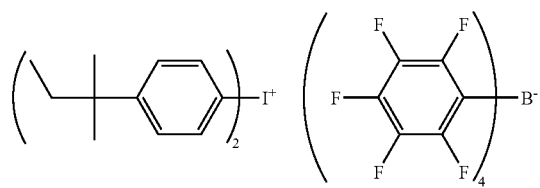 (b-79)
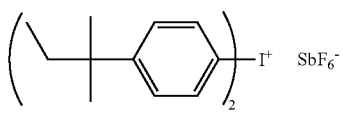 (b-80)
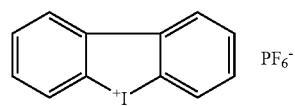 (b-81)
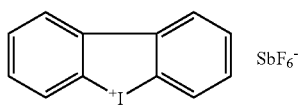 (b-82)
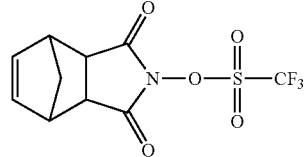 (b-83)
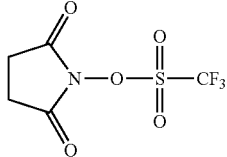 (b-84)
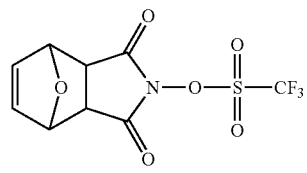 (b-85)
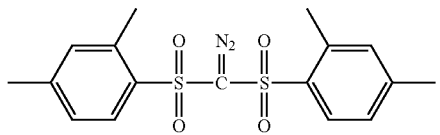 (b-86)
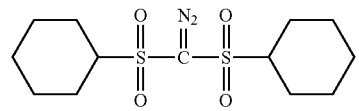 (b-87)
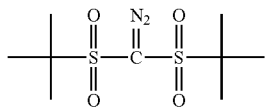 (b-88)
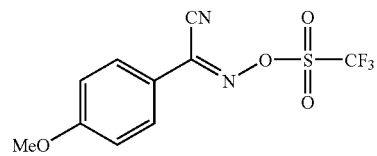 (b-89)
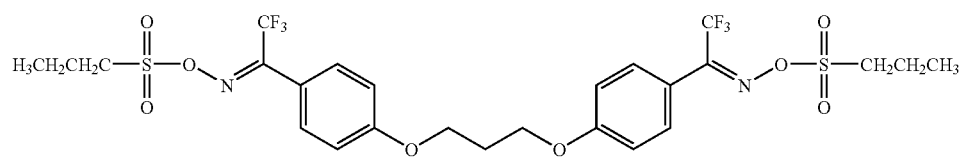 (b-90)
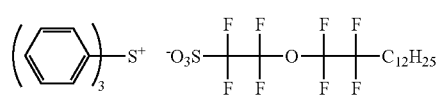 (b-91)
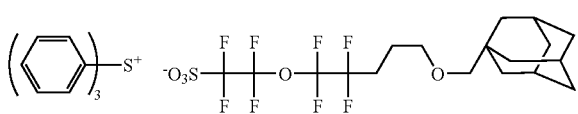 (b-92)

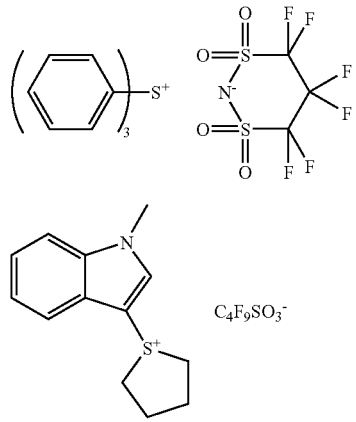
(b-93)

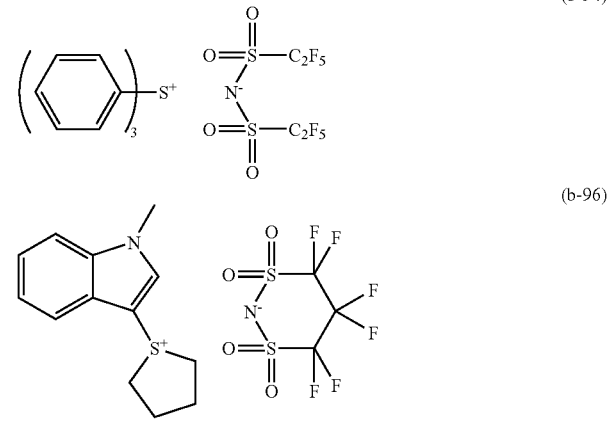
(b-94)

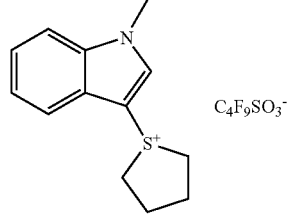
(b-95)

(b-96)

In addition, the oxazole derivatives, s-triazine derivatives and the like described in JP-A No. 2002-122994, paragraph [0029] and [0030], may also be favorably used Further, the onium salt and sulfonate compounds exemplified in JP-A No. 2002-122994, paragraph [0037] to [0063], may also be used favorably.

The photo-acid generator (b) may be used alone or in combination of two or more.

The content of the photo-acid generator (b) in the ink composition is preferably 0.1 to 20 wt %, more preferably 0.5 to 10 wt %, and still more preferably 1 to 7 wt % in proportion to the total solid content of the ink composition.

In addition to the essential components mentioned above, various additives may be added to the ink composition according to the invention. These optional components added as needed will be described hereinafter.

[(d) Colorant]

By adding a colorant in the ink composition of the present invention, a visible image can be formed. For example, although addition of colorant is not necessarily needed for forming an image region on a planographic printing plate, it is also preferable from the viewpoint of efficiency for plate-checking of the obtained planographic printing plate.

The colorant that can be used is not particularly limited, and any known colorants of various kinds (pigments or dyes) may be selected and used as appropriate according to usage. For example, use of a pigment is preferable for forming an image superior in weather resistance. As a dye, both water-soluble and oil-soluble dyes may be used, but the oil soluble dye is preferable.

The pigments favorably used in the invention will be described below.

(Pigment)

The pigment is not particularly limited, and examples thereof include all common commercially-available organic and inorganic pigments, dispersions of the pigments dispersed in a dispersion medium such as an insoluble resin, pigments with a surface on which a resin is grafted, and the like. Alternatively, for example, resin particles colored with a dye may also be used.

Such pigments include the pigments described, for example, in Seijiro Itoh Ed., "Dictionary of Pigments" (2000), W. Herbst K. Hunger, Industrial Organic Pigments", and JP-A Nos. 2002-12607, 2002-188025, 2003-26978, and 2003-342503.

Typical examples of the organic and inorganic pigments to be used in the invention include the followings:

Yellow pigments, e.g., monoazo pigments such as C.I. Pigment Yellow 1 (Fast Yellow G, etc.) and C.I. Pigment Yellow 74; disazo pigments such as C.I. Pigment Yellow 12 (Disazo Yellow AAA, etc.) and C.I. Pigment Yellow 17; non-benzidine azo pigments such as C.I. Pigment Yellow 180; azolake pigments such as C.I. Pigment Yellow 100 (tartrazine yellow lake, etc.); condensation azo pigments such as C.I. Pigment Yellow 95 (Condensation Azo Yellow GR, etc.); acidic-dye lake pigments such as C.I. Pigment Yellow 115 (quinoline yellow lake, etc.); basic-dye lake pigments such as C.I. Pigment Yellow 18 (thioflavin lake, etc.); anthraquinone pigments such as fravantrone yellow (Y-24); isoindolinone pigments such as Isoindolinone Yellow 3RLT (Y-110); quinophthalone pigments such as quinophthalone yellow (Y-138); isoindoline pigments such as isoindoline yellow (Y-139); nitroso pigments such as C.I. Pigment Yellow 153 (nickel nitroso yellow, etc.); metal complex salt azomethine pigments such as C.I. Pigment Yellow 117 (copper azomethine yellow, etc.); and the like.

Red or magenta pigments, e.g., monoazo pigments such as C.I. Pigment Red 3 (toluidine red, etc.); disazo pigments such as C.I. Pigment Red 38 (pyrazolone red B, etc.); azolake pigments such as C.I. Pigment Red 53:1 (lake red C, etc.) and C.I. Pigment Red 57:1 (Brilliant Carmine 6B); condensation azo pigments such as C.I. Pigment Red 144 (Condensation Azo Red BR, etc.); acidic-dye lake pigments such as C.I. Pigment Red 174 (Phloxine B lake, etc.); basic dye lake pigments such as C.I. Pigment Red 81 (Rhodamine 6G' Lake, etc.); anthraquinone pigments such as C.I. Pigment Red 177 (dianthraquinolyl red, etc.); thioindigo pigments such as C.I. Pigment Red 88 (Thioindigo Bordeaux, etc.); perynone pigments such as C.I. Pigment Red 194 (perynone red, etc.); perylene pigments such as C.I. Pigment Red 149 (perylene scarlet, etc.); quinacridone pigments such as C.I. Pigment Violet 19 (unsubstituted quinacridone) and C.I. Pigment Red 122 (quinacridone magenta, etc.); isoindolinone pigments such as C.I. Pigment Red 180 (Isoindolinone Red 2BLT, etc.); alizarin lake pigments such as C.I. Pigment Red 83 (madder lake, etc.); and the like.

Blue or cyan pigments, e.g., disazo pigments such as C.I. Pigment Blue 25 (dianisidine blue, etc.); phthalocyanine pigments such as C.I. Pigment Blue 15 (phthalocyanine blue, etc.); acidic-dye lake pigments such as C.I. Pigment Blue 24 (peacock blue lake, etc.); basic dye lake pigments such as C.I.

Pigment Blue 1 (Victoria Pure Blue BO lake, etc.); anthraquinone pigments such as C.I. Pigment Blue 60 (indanthron blue, etc.); alkali blue pigments such as C.I. Pigment Blue 18 (Alkali Blue V-5:1); and the like.

Green pigments, e.g., phthalocyanine pigments such as C.I. Pigment Green 7 (phthalocyanine green) and C.I. Pigment Green 36 (phthalocyanine green); azo metal complex pigments such as C.I. Pigment Green 8 (nitroso green); and the like.

Orange pigments, e.g., isoindoline pigments such as C.I. Pigment Orange 66 (isoindoline orange); anthraquinone pigments such as C.I. Pigment Orange 51 (dichloropyranthron orange); and the like.

Black pigments, e.g., carbon black, titanium black, aniline black, and the like.

White pigments, e.g., basic lead carbonate ($2PbCO_3Pb(OH)_2$, so-called silver white), zinc oxide ($ZnO$, so-called zinc white), titanium oxide ($TiO_2$, so-called titanium white), strontium titanate ($SrTiO_3$, so-called titanium strontium white), and the like.

Titanium oxide has a lower density and a higher refractive index, and further superior chemical and physical stability as compared with other white pigments, thus having a greater masking and coloring properties as a pigment, and is excellent in resistance to acid or alkali and other environmental factors. Thus, use of titanium oxide as the white pigment is preferable. Other white pigments (including white pigments other than those described above) may also be used as needed.

For dispersing the pigment, dispersing machines may be used, such as a ball mill, sand mill, attritor, roll mill, jet mill, homogenizer, paint shaker, kneader, agitator, Henschel mixer, colloid mill, ultrasonic wave homogenizer, pearl mill, and a wet jet mill. A dispersant may also be added at the time of dispersing a pigment.

Examples of the dispersants include hydroxyl group-containing carboxylic esters, salts of a long-chain polyaminoamide with a high-molecular acid ester, high-molecular polycarboxylic acid salts, high-molecular unsaturated acid esters, copolymers, modified polyacrylates, aliphatic polyvalent carboxylic acids, naphthalenesulfonic acid/formalin condensates, polyoxyethylene alkyl phosphoric esters, pigment derivatives, and the like. Use of a commercially available polymer dispersant, such as a SOLSPERSE series product of ZENECA, is also preferable.

It is also possible to use a synergist suitable for the pigment used as the dispersion aid. These dispersants and dispersion aids are preferably added in an amount of 1 to 50 parts by weight relative to 100 parts by weight of the pigment.

As a dispersion medium for the components such as a pigment in the ink composition, a solvent may be added, or the cationically polymerizable compound (a), being a low-molecular weight component, may be used without solvent. However, since the ink composition of the present invention is radiation-curable and is cured after application on a recording medium, the ink preferably contains no solvent. This is because the solvent remaining in the hardened ink image may cause deterioration in solvent resistance or problems of VOC (Volatile Organic Compound) of the residual solvent. In view of this, the dispersion medium is preferably a cationically polymerizable compound (a), and selecting a cationic-polymerization monomer with the lowest viscosity is particularly preferable from the viewpoint of improving dispersibility and handling efficiency of the ink composition.

The average diameter of the pigment is preferably in the range of 0.02 to 0.4 µm, more preferably 0.02 to 0.1 µm, and still more preferably 0.02 to 0.07 µm.

The pigment, dispersant, and dispersion medium are selected and conditions of dispersion and filtration are determined such that the average diameter of the pigment particles is within the above preferable range. Control of particle diameter enables prevention of clogging in head nozzles and retaining of storage stability, transparency and curing sensitivity of the ink.

The colorant is preferably added in an amount of 1 to 20 wt %, more preferably 2 to 10 wt %, in proportion to the total solid content of the ink composition.

(Dye)

The dye used in the present invention is preferably oil-soluble. Specifically, the dye preferably has solubility in water (represented by the weight of the colorant dissolved in 100 g of water) of 1 g or less at 25° C., preferably 0.5 g or less, and more preferably 0.1 g or less. Accordingly, so-called water-insoluble and oil-soluble dyes are favorably used.

The oil-soluble dye preferably has a melting point of 200° C. or lower, more preferably 150° C. or lower, and still more preferably 100° C. or lower. Use of a low-melting point oil-soluble dye enables restriction of crystal precipitation of the colorant in the ink composition and improvement in storage stability of the ink composition.

The dye preferably has a high oxidation potential, in terms of improving resistance to deterioration of color, and in particular to oxidative substances such as ozone. Thus, the oil-soluble dye used in the present invention preferably has an oxidation potential of 1.0 V or more (vs. SCE). Higher oxidation potential is preferable, thus a dye having an oxidation potential of 1.1 V or more (vs. SCE) is more preferable, and that of 1.15 V or more (vs. SCE) is particularly preferable.

As the yellow dyes, compounds having a structure of Formula (Y-I) described in JP-A No. 2004-250483 are preferable.

Example of particularly preferable yellow dyes include the dyes represented by Formulae (Y-II) to (Y-IV) in JP-A No. 2004-250483, paragraph [0034], and specific examples thereof include the compounds described in JP-A No. 2004-250483, paragraph [0060] to [0071]. The oil-soluble dyes represented by Formula (Y-I) described therein may be used not only in yellow ink, but also in inks of any other colors such as black and red.

As the magenta dyes, compounds having the structures represented by Formulae (3) and (4) in JP-A No. 2002-114930 are preferable, and typical examples thereof include the compounds described in JP-A No. 2002-114930, paragraph [0054] to [0073].

Particularly preferable magenta dyes are the azo dyes represented by Formulae (M-1) to (M-2) in JP-A No. 2002-121414, paragraph [0084] to [0122], and typical examples thereof include the compounds described in JP-A No. 2002-121414, paragraph [0123] to [0132]. The oil-soluble dyes represented by Formulae (3), (4), and (M-1) to (M-2) may be used not only in magenta ink, but also in inks of any other colors such as black and red inks.

As the cyan dyes, compounds represented by Formulae (I) to (IV) in JP-A No. 2001-181547 and the dyes represented by Formulae (IV-1) to (IV-4) in JP-A No. 2002-121414, paragraph [0063] to [0078], and specific examples thereof include the compounds described in JP-A 2001-181547, paragraph [0052] to [0066] and in JP-A 2002-121414, paragraph [0079] to [0081].

Particularly preferable cyan dyes are the phthalocyanine dyes of Formulae (C-I) and (C-II) described in JP-A No. 2002-121414, paragraph [0133] to [0196], and still more preferable are the phthalocyanine dyes represented by Formula (C-II). Specific examples thereof include the compounds described in JP-A No. 2002-121414, paragraph [0198] to [0201]. The oil-soluble dyes represented by Formulae (I) to (IV), (IV-1) to (IV-4), (C-I), and (C-II) may be used not only in cyan ink, but also in inks of any other colors such as black and green inks.

As for the dyes to be used in the present invention, it is also preferable to introduce an oil-solubilizing group in the core of the dyes described above, to ensure that the necessary amount of dye is dissolved in the ink composition.

Examples of the oil-solubilizing groups include long-chain branched alkyl groups, long-chain branched alkoxy groups, long-chain branched alkylthio groups, long-chain branched alkylsulfonyl groups, long-chain branched acyloxy groups, long-chain branched alkoxycarbonyl groups, long-chain branched acyl groups, long-chain branched acylamino groups, long-chain branched alkylsulfonylamino groups, long-chain branched alkylaminosulfonyl groups, as well as aryl, aryloxy, aryloxycarbonyl, arylcarbonyloxy, arylaminocarbonyl, arylaminosulfonyl, and arylsulfonylamino groups containing these long-chain branched substituent groups, and the like.

Alternatively, conversion of an oil-solubilizing group may be performed, such as alkoxycarbony, aryloxycarbonyl, alkylaminosulfonyl or arylaminosulfonyl, on water-soluble dyes having carboxylic acid or sulfonic acid groups, by using a long-chain branched alcohol, amine, phenol, or aniline derivative.

—Oxidation Potential—

The oxidation potential value (Eox) of the dye in the invention can be easily determined by those skilled in the art. These methods are described, for example, in P. Delahay, "New Instrumental Method in Electrochemistry" (1954, Interscience Publishers), A. J. Bard et al., "Electrochemical Methods" (1980, John Wiley & sons), and Akira Fujishima et al., "Electrochemical Measurement Methods" (1984, Gihodo Shuppan).

Specifically, the oxidation potential value is measured by dissolving a test sample at a concentration of $1 \times 10^{-2}$ to $1 \times 10^{-6}$ mole/liter in a solvent such as dimethylformamide or acetonitrile containing a supporting electrolyte such as sodium perchlorate or tetrapropylammonium perchlorate. An oxidation wave is obtained applying a voltage to the anodic side (higher side), using carbon (GC) as the working electrode and a revolving platinum electrode as the counter electrode in a cyclic voltametric or direct-current polarographic apparatus, then the oxidation wave is approximated by a straight line. Intersecting points of the straight line of oxidation wave and a straight line of residual current-potential, and the straight line of oxidation wave and a straight line of saturated current (or a straight line that is parallel to the vertical line that passes through the peak of electric potential) are calculated. The medium voltage at the center of the line connecting the two intersecting points is measured as the value against SCE (saturated calomel electrode). The value may deviate to a certain extent, approximately by several dozen millivolts, under the influence of the difference in voltage between the liquids or the liquid resistivity of the sample solution, but it is possible to assure the reproducibility of the electric potential by using a standard sample (e.g., hydroquinone). The supporting electrolyte and the solvent for use may be selected as appropriate according to the oxidation potential and solubility of the test sample. The supporting electrolyte and the solvent for use are described in Akira Fujishima et al., "Electrochemical Measurement Methods" (1984, Gihodo Shuppan) pp. 101 to 118.

[Other Components]

In the ink composition of the present invention, in addition to the essential components (a) to (c) and an optional colorant (d), various known additives that are used in an ink composition may be used as appropriate according to usage, as long as advantages of the present invention is not hindered.

In the following, a variety of additives that are used as needs arise will be described.

[Compounds Having Basic Nitrogen Atom]

In the invention, for the purpose of improving the storage stability of the ink composition, a compound having a basic nitrogen atom (hereinafter, appropriately referred to as particular base component) may be contained, if desired. The compound preferably has a basic nitrogen atom, and the pKa of a conjugate acid thereof is 4 or more. A pKa value stipulated here is determined as the value obtained by attaching a minus sign to a natural logarithm of the dissociation constant Ka of a weak electrolyte in an aqueous solution, i.e., $pKa = -\log_{10} Ka$.

Examples of such compounds include: anilines such as 2-chloroaniline, 2-bromoaniline, 4-methylaniline, 3-chroloaniline, 3,5-dibromoaniline, N-methylaniline, N,N-dimethylaniline, N,N-diethylaniline, N,N-bis(hydroxyethyl)aniline, 3-nitroaniline, 2-aminobenzoic acid, 4-aminoazobenzene, N-phenylaniline and N-phenylglycine; pyridines such as 3-chloropyridine, 3-bromopyridine, 4-hydroxypyridine, 3-carboxypyridine, 2,6-dimethylpyridine and 2,4,6-trimethylpyridine; cyclic amines such as proline, hydroxyproline, purine, 8-hydroxypurine, N-methylpyrazine, thiazole and tryptophan; aliphatic amino acids such as arginine, aspartic acid, glutamic acid, N-methylglycine, N-propylglycine, histidine, cystine, leucine, isoleucine, ornithine, serine, threonine, methionine, alanine and methoxyalanine; and aliphatic tertiary amines such as trimethylamine, triethylamine, tributylamine, diisopropylethylamine and trioctylamine. Additionally, compounds having a 1,3-diazapropene structure can be specifically cited. However, as long as the compound has a basic nitrogen atom in the molecular structure, they are not restricted to the examples. Still more preferred examples thereof include compounds represented by Formulae (X) to (XIII).

(X)

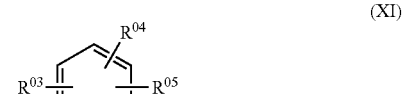

(XI)

(XII)

(XIII)

In Formulae (X) to (XIII), $R^{01}$ and $R^{02}$ each independently represent a hydrogen atom or an alkyl group, cycloalkyl group, aralkyl group or aryl group that may be substituted or not, and Ar$^{01}$ represents an aryl group that may be substituted or not. R$^{03}$ to R$^{05}$ each independently represent a hydrogen atom or an alkyl group, cycloalkyl group, aralkyl group, aryl group, hydroxyl group, carboxyl group, cyano group, nitro group, acyl group or —N(R$^{01}$)(R$^{02}$) group that may be substituted or not. R$^{06}$ to R$^{08}$ and R$^{010}$ to R$^{012}$ each independently represent a hydrogen atom or an alkyl group, cycloalkyl group or aralkyl group that may be substituted or not. R$^{09}$ represents an alkyl group, cycloalkyl group, aralkyl group, aryl group, —N(R$^{013}$)(R$^{014}$) group, or —OR$^{015}$ group that may be substituted or not. R$^{013}$ to R$^{015}$ each independently represent a hydrogen atom, or an alkyl group, cycloalkyl group, or aralkyl group that may be substituted or not. Furthermore, R$^{01}$ and R$^{02}$ in Formula (X), any two of R$^{03}$ to R$^{05}$ in Formula (XI), any two of R$^{06}$ to R$^{08}$ in Formula (XII), or any two of R$^{09}$ to R$^{015}$ in Formula (XIII) may be bonded with each other to form an aliphatic ring, an aromatic ring or a hetero ring.

The alkyl group, cycloalkyl group, aralkyl group, aryl group and substituent groups that can be introduced therein are the same as those described in the case of the Formulae (I) to (IX).

As the particular base component, specifically, compounds (X-1) to (XIII-12) below can be cited. However, the invention is not restricted thereto.

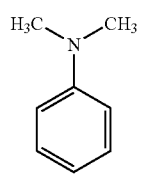
(X-1)

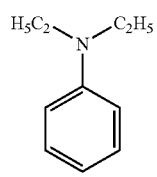
(X-2)

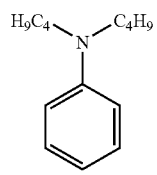
(X-3)

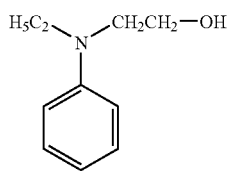
(X-4)

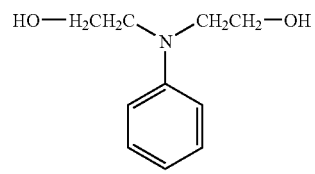
(X-5)

-continued

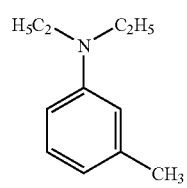
(X-6)

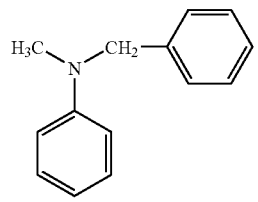
(X-7)

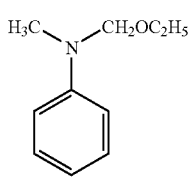
(X-8)

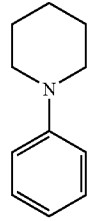
(X-9)

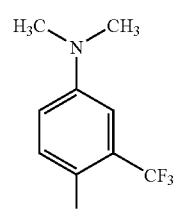
(X-10)

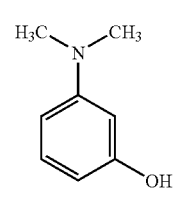
(X-11)

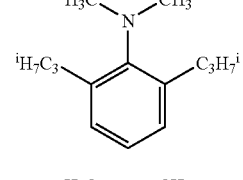
(X-12)

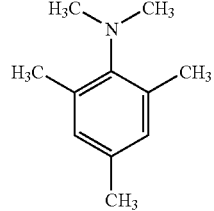
(X-13)

-continued
(X-14)
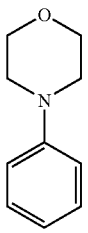
(X-15)
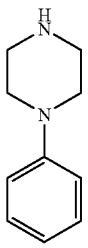
(X-16)
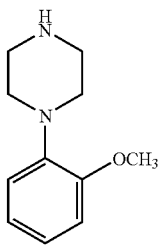
(X-17)
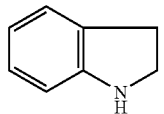
(X-18)
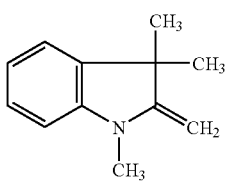
(X-19)
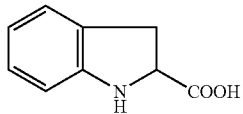
(X-20)
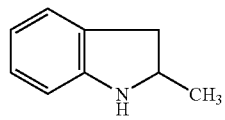
(X-21)
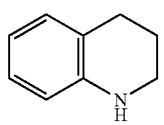
(X-22)
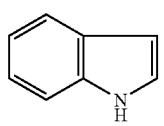
-continued
(X-23)
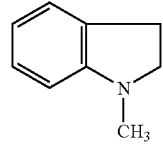
(X-24)
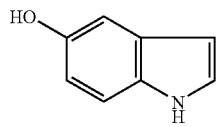
(X-25)
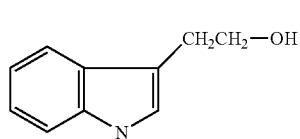
(X-26)
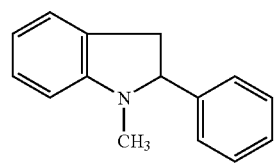
(X-27)
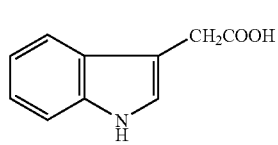
(X-28)
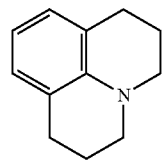
(X-29)
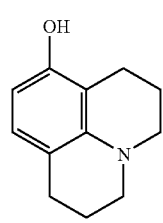
(X-30)
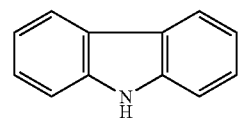
(X-31)
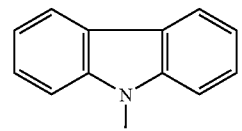
(X-32)
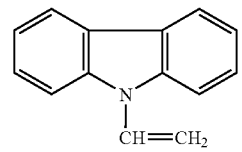

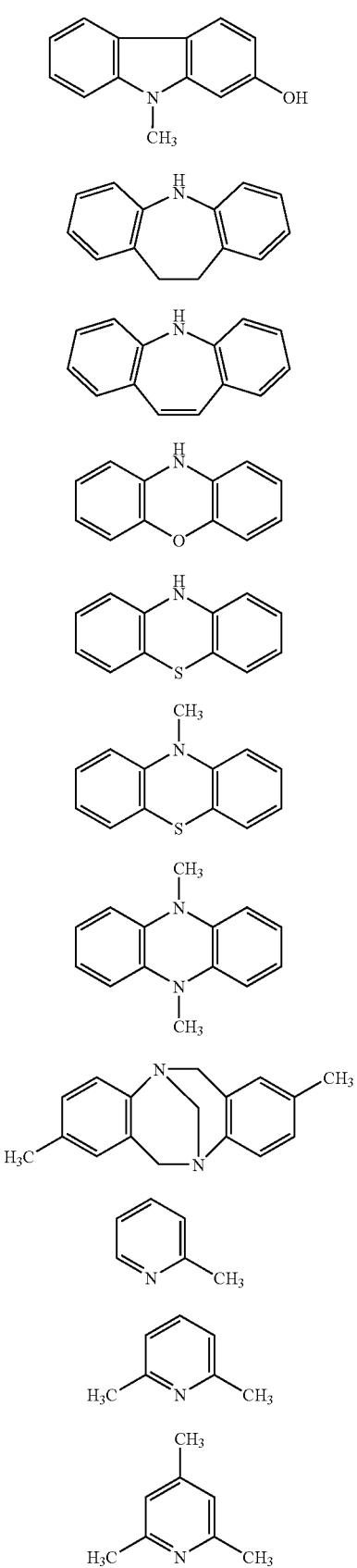
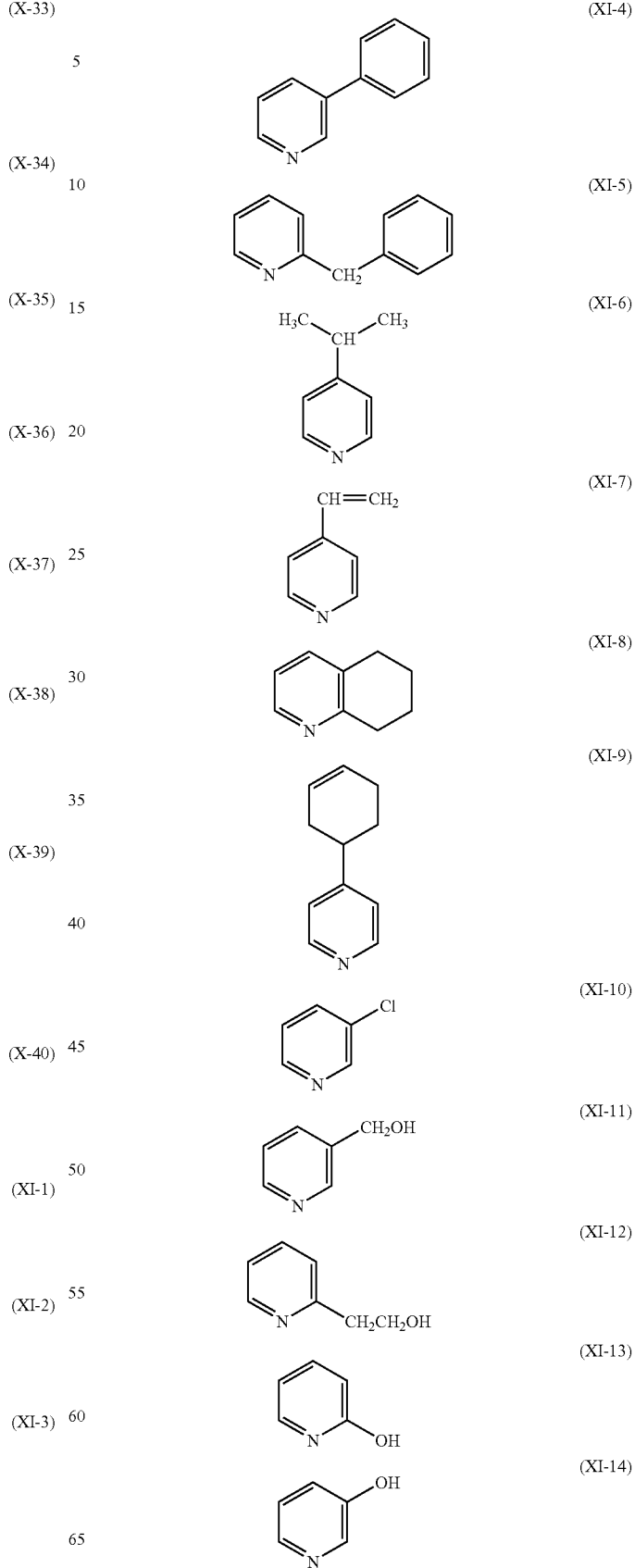

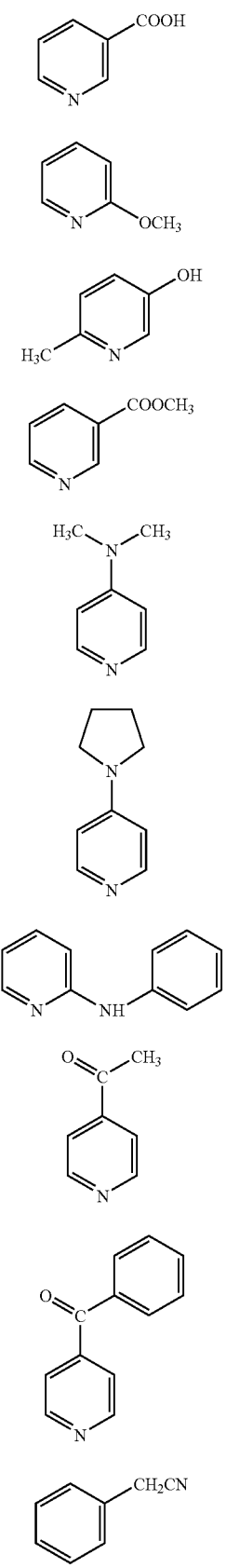
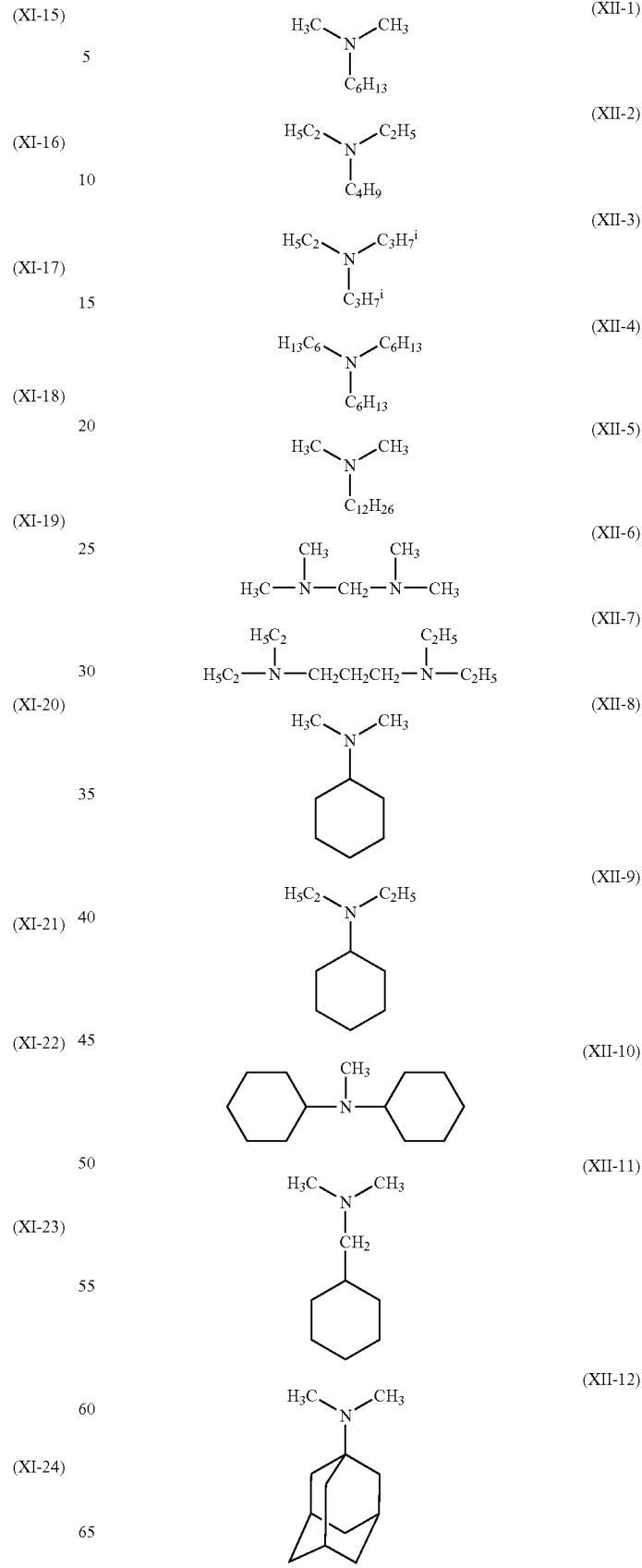

-continued
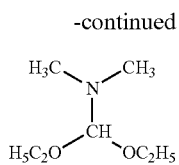 (XII-13)
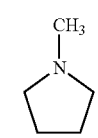 (XII-14)
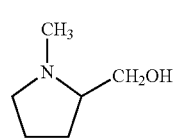 (XII-15)
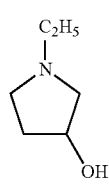 (XII-16)
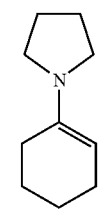 (XII-17)
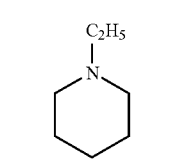 (XII-18)
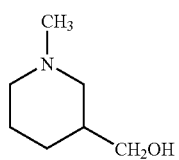 (XII-19)
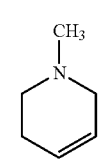 (XII-20)
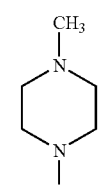 (XII-21)
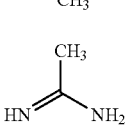 (XIII-1)
-continued
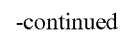 (XIII-2)
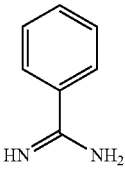 
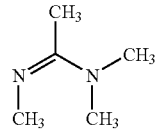 (XIII-3)
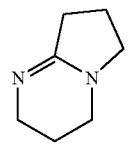 (XIII-4)
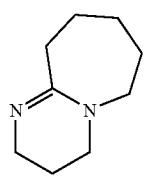 (XIII-5)
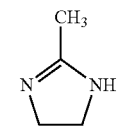 (XIII-6)
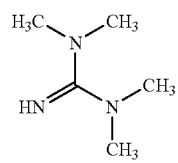 (XIII-7)
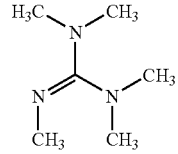 (XIII-8)
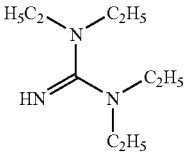 (XIII-9)
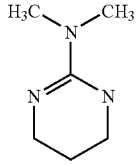 (XIII-10)
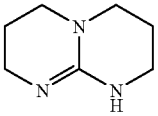 (XIII-11)

-continued

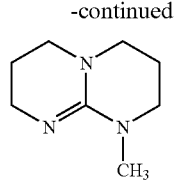

(XIII-12)

In the ink composition of the invention, only one kind of the particular base component may be added or may be in combination of two or more kinds. A content of the particular base component in the ink composition is, in proportion to a total solid content of the composition, suitably in the range of 0.001 to 10% by weight, preferably in the range of 0.01 to 7% by weight and more preferably in the range of 0.03 to 5% by weight. Furthermore, the ratio to the compound that generates an acid by irradiation of a radiation ray (b) is in the range of 0.1 to 50% by mole, and preferably in the range of 0.5 to 20% by mole.

[Organic Acidic Compound Showing pKa Value of 2 to 6]

In the invention, as appropriate, an organic acidic compound having a pKa of 2 to 6 may be further used. The organic acidic compound that shows the pKa value of 2 to 6 (hereinafter, simply referred to as [organic acidic component]) corresponds to a weak acidic organic compound, from the qualitative point of view. When the pKa is in the above range, the ink composition of the invention is excellent in sensitivity and stability with time.

Specific examples of the specific compounds include, in particular, carboxylic acids such as aliphatic or aromatic monocarboxylic acids, dicarboxylic acids and tricarboxylic acids having 1 to 20 carbon atoms such as acetic acid, phenyl acetic acid, phenoxy acetic acid, methoxy propionic acid, lactic acid, hexanoic acid, heptanoic acid, octanoic acid, palmitic acid, stearic acid, oleic acid, linolenic acid, cyclopropylcarboxylic acid, cyclobutanecarboxylic acid, cyclopentanecarboxylic acid, cyclohexanecarboxylic acid, 1-adamantanecarboxylic acid, 1,3-adamantanedicarboxylic acid, norbornen-2,3-dicarboxylic acid, abietic acid, trans-retinoic acid, cyclohexylacetic acid, dicyclohexylacetic acid, adamantaneacetic acid, malonic acid, malonic acid monomethyl ester, fumaric acid, maleic acid, maleic acid monomethyl ester, itaconic acid, crotonic acid, succinic acid, adipic acid, sebacic acid, glycolic acid, diglycolic acid, mandelic acid, tartaric acid, malic acid, arginic acid, cinnamic acid, methoxycinnamic acid, 3,5-dimethoxycinnamic acid, benzoic acid, salicylic acid, 4-hydroxybenzoic acid, gallic acid, 3-nitrobenzoic acid, 3-chlorobenzoic acid, 4-vinylbenzoic acid, t-butylbenzoic acid, 1-naphthoic acid, 1-hydroxy-2-naphthoic acid, fluorenone-2-carboxylic acid, 9-anthracenecarboxylic acid, 2-anthraquinonecarboxylic acid, phthalic acid, phthalic acid monomethyl ester, isophthalic acid, terephthalic acid, trimellitic acid, and trimellitic acid monomethyl ester. However, the invention is not restricted thereto.

When the organic acidic component is used in the ink composition of the invention, a content thereof in proportion to a total solid content of the ink composition is preferably in the range of 0.001 to 10% by weight, more preferably in the range of 0.01 to 7% by weight and still more preferably in the range of 0.05 to 5% by weight. Furthermore, when the particular base component is used, the ratio of the particular base component and the organic acidic component is preferably in the range of 0.1 to 4 and more preferably in the range of 0.3 to 2 by molar ratio of (particular base component)/(organic acidic component).

[Ultraviolet Absorbent]

An ultraviolet absorbent may be added to the ink composition of the invention, for improvement in weather fastness and prevention of discoloration of the obtained image.

Examples of the ultraviolet absorbents include the benzotriazole compounds described in JP-A Nos. 58-185677, 61-190537, 2-782, 5-197075 and 9-34057 and others; the benzophenone compounds described in JP-A Nos. 46-2784 and 5-194483, U.S. Pat. No. 3,214,463, and others; the cinnamic acid compounds described in JP-B Nos. 48-30492 and 56-21141, JP-A No. 10-88106, and others; the triazine compounds described in JP-A Nos. 4-298503, 8-53427, 8-239368, 10-182621 and 8-501291, and others; the compounds described in Research Disclosure No. 24239; compounds that emit light by absorbing ultraviolet ray such as stilbene and benzoxazole compounds; so-called fluorescent brighteners; and the like. The addition amount may be suitably determined according to usage, but is generally 0.5 to 15 wt % on the basis of the solid content in the ink composition.

(Sensitizer)

A sensitizer may be added to the ink composition according to the invention, for improvement in acid-generating efficiency of photo-acid generator and for a longer wavelength for exposure. The sensitizer is not particularly limited, as long as it sensitizes the photo-acid generator in the electron- or energy-transfer mechanism. Favorable examples thereof include aromatic fused-ring compounds such as anthracene, 9,10-dialkoxyanthracene, pyrene and perylene; aromatic ketone compounds such as acetophenone, benzophenone, thioxanthone and Michler's ketone; and heterocyclic ring compounds such as phenothiazine and N-aryloxasolidinones. The addition amount can be decided as appropriate according to usage, but generally 0.01 to 1 mol %, preferably 0.1 to 0.5 mol %, relative to the photo-acid generator.

(Antioxidant)

An antioxidant may be added, for improvement of stability of the ink composition. Examples of the antioxidants include those described in EP Patent Laid-Open Nos. 223739, 309401, 309402, 310551, 310552 and 459416, German Patent Laid-Open No. 3435443, JP-A Nos. 54-48535, 62-262047, 63-113536, 63-163351, 2-262654, 2-71262, 3-121449, 5-61166, and 5-119449, U.S. Pat. Nos. 4,814,262 and 4,980,275, and others. The addition amount can be determined as appropriate according to usage, but generally 0.1 to 8 wt % on the basis of the solid content in the ink composition.

(Discoloration Inhibitor)

Any one of various organic and metal complex-based discoloration inhibitors may be used in the ink composition according to the invention. Examples of the organic discoloration inhibitor include hydroquinones, alkoxyphenols, dialkoxyphenols, phenols, anilines, amines, indanes, chromanes, alkoxyanilines, heterocyclic rings, and the like. Examples of the metal complex-based discoloration inhibitors include nickel complexes, zinc complexes, and the like; Specific examples thereof include the compounds described in the patents cited in Research Disclosure No. 17643 (sections VII-I to J), ibid., No. 15162, ibid., No. 18716 (left column on p. 650), ibid., No. 36544 (p. 527), ibid., No. 307105 (p. 872), and ibid., No. 15162; and the compounds included in the Formula of typical compounds and the exemplary compounds described in JP-A No. 62-215272, pp. 127 to 137. The addition amount can be determined as appropriate according to usage, but generally 0.1 to 8 wt % on the basis of the solid content in the ink composition.

(Conductive Salt)

A conductive salt such as potassium thiocyanate, lithium nitrate, ammonium thiocyanate, or dimethylamine hydrochloride may be added to the ink composition according to the invention, for control of the physical properties during ejection.

(Solvent)

Addition of a very slight amount of organic solvent to the ink composition according to the invention is effective for improvement in adhesiveness to the recording medium.

Examples of the solvents include ketone solvents such as acetone, methylethylketone, and diethylketone; alcohol solvents such as methanol, ethanol, 2-propanol, 1-propanol, 1-butanol, and tert-butanol; chlorine-based solvents such as chloroform and methylene chloride; aromatic solvents such as benzene and toluene; ester solvents such as ethyl acetate, butyl acetate, and isopropyl acetate; ether solvents such as diethyl ether, tetrahydrofuran, and dioxane; glycol ether solvents such as ethylene glycol monomethyl ether and ethylene glycol dimethyl ether; and the like.

When a solvent is used, the amount of the solvent added is in the range that does not cause problems such as solvent resistance and VOC, and thus, preferably in the range of 0.1 to 5 wt %, more preferably 0.1 to 3 wt %, in the entire ink composition.

[Polymer Compound]

Various polymer compounds may be added to the ink composition, for adjustment of film physical properties. Examples of the polymer compounds include acrylic polymers, polyvinylbutyral resins, polyurethane resins, polyamide resins, polyester resins, epoxy resins, phenol resins, polycarbonate resins, polyvinylbutyral resins, polyvinylformal resins, shellac, vinyl resins, acrylic resins, rubber resin, waxes, other natural resins, and the like. These resins may be used in combination of two or more. Among them, vinyl copolymers obtained by copolymerization with an acrylic monomer are preferable. In addition, copolymers containing a "carboxyl group-containing monomer", an "alkyl methacrylate", or an "alkyl acrylate" as the structural unit in a copolymerization component are also used favorably for the polymer binding material.

[Surfactant]

The surfactants include those described in JP-A Nos. 62-173463 and 62-183457. Examples thereof include anionic surfactants such as dialkylsulfosuccinic acid salts, alkylnaphthalenesulfonic acid salts, and fatty acid salts; nonionic surfactants such as polyoxyethylene alkyl ethers, polyoxyethylene alkyl allyl ethers, acetylene glycols, and polyoxyethylene-polyoxypropylene block copolymers; cationic surfactants such as alkylamine salts and quaternary ammonium salts; and the like. An organic fluorine compound may be used instead of the surfactant. The organic fluorine compound is preferably hydrophobic. Examples of the organic fluorine compounds include fluorine-type surfactants, oily fluorine-type compounds (e.g., fluorine oil) and solid fluorine-type compound resins (e.g., polytetrafluoroethylene); and typical examples thereof include those described in JP-B No. 57-9053 (Columns 8 to 17) and JP-A No. 62-135826.

Other additives may also be added as appropriate, such as a leveling additive, a matting agent, a wax for adjustment of film physical properties, or a tackifier for improvement of adhesiveness to a recording medium of polyolefin, PET or the like, that does not inhibit polymerization.

Specific examples of tackifiers include high-molecular weight adhesive polymers described in JP-A 2001-49200, pp. 5 to 6 (e.g., copolymers of an ester of a (meth)acrylic acid and an alcohol with an alkyl group having 1 to 20 carbon atoms, an ester of a (meth)acrylic acid and an alicyclic alcohol having 3 to 14 carbon atoms, and an ester of a (meth)acrylic acid and an aromatic alcohol having 6 to 14 carbon atoms), and low-molecular weight adhesive imparting resins containing a polymerizable unsaturated bond, and the like.

Considering the ejection efficiency when applied to inkjet recording, the ink composition according to the invention preferably has an ink viscosity of 7 to 30 mPa·s, more preferably 7 to 20 mPa·s, at a temperature at which the ink is ejected, and thus, it is preferable to adjust and determine the composition ratio appropriately so that the viscosity falls within the range. The viscosity of the ink composition at 25 to 30° C. is preferably 35 to 500 mPa·s, and more preferably 35 to 200 mPa·s. By increasing the viscosity at room temperature, permeation of ink into a recording medium can be prevented, even when a porous recording medium is used, thus the amount of uncured monomer and odor can be reduced. Further, ink bleeding at the time of ink droplets being ejected onto the recording medium can be suppressed, thereby improving the image quality. When the ink viscosity at 25 to 30° C. is within the above range, sufficient effects of preventing ink bleeding can be achieved, and delivery of an ink liquid is favorable.

The surface tension of the ink composition according to the invention is preferably 20 to 30 mN/m and more preferably 23 to 28 mN/m. When the ink is applied onto recording mediums of various types, such as polyolefin, PET, coated paper, and non-coated paper, the surface tension is preferably 20 mN/m or more, from the viewpoint of preventing bleeding and penetration of ink, and 30 mN/m or less, from the viewpoint of improving compatibility.

The ink composition according to the invention thus adjusted is favorably used as an inkjet recording ink. The ink composition is ejected onto a recording medium by an inkjet printer, and then the ejected ink composition is cured by irradiating a radiation ray.

The printed material obtained using the ink of the invention is superior in strength in the image area which is cured by irradiating a radiation ray such as an ultraviolet ray, and thus applicable to various uses other than formation of an image, such as formation of an ink receiving layer (image area) of planographic printing plate.

[Inkjet Recording Method and Inkjet Recording Apparatus]

The inkjet recording method and the inkjet recording apparatus, that may favorably be applied to the present invention, will now be described.

The inkjet recording method of the invention is an inkjet recording method comprising:

(i) ejecting the ink composition of the invention onto a recording medium; and (ii) curing the ejected ink composition by irradiating with a radiation ray.

The printed material of the invention is a recording material that is recorded by the inkjet recording method of the invention In the inkjet recording method of the invention, it is preferable to heat the ink composition so that the temperature thereof is 40 to 80° C., adjusting the viscosity of the ink composition to be within 7 to 30 mPa·s, and then ejecting the ink composition In this way, a high degree of ejection stability can be achieved. Generally, radiation-curable ink compositions have higher viscosity than that of aqueous inks, and fluctuation in viscosity of the radiation-curable ink compositions is larger, due to variation in temperature during printing. Such fluctuation in viscosity of the ink composition significantly and directly influences the droplet size and the droplet ejection speed, causing deterioration in image quality. Therefore, it is necessary to keep the temperature of the ink composition as constant as possible, during printing. The range of the temperature of the ink composition to be controlled is preferably ±5° C., more preferably ±2° C., and still more preferably ±1° C., from the preset temperature.

The inkjet recording apparatus is provided with a unit for stabilizing the temperature of the ink composition, which characterizes an aspect of the invention, and area where the temperature is to be controlled include the whole piping system and all members, the area ranging from an ink tank (or an intermediate tank, if present) to a nozzle ejection face.

The method of controlling temperature is not particularly limited, but, for example, each piping unit is preferably provided with multiple temperature sensors, and heating control is performed in accordance with the flow of ink and environmental temperature. In addition, the head unit to be heated is preferably thermally insulated or protected, for prevention of the environmental influences on the apparatus. It is preferable to insulate the heating unit from other units and minimize the heat capacity of the entire heating unit, for shortening the start-up time required for heating or for reducing the loss in heat energy.

Irradiation conditions will be now described. A basic irradiation method is disclosed in JP-A No. 60-132767. Specifically, two radiation sources are placed at both side of a head unit, and the head unit and the radiation sources are scanned in a shuttle mode. Irradiation is performed after a certain period of time from ejection of the ink composition. Further, curing of the ink composition is completed by irradiating with another radiation source that is not driven. WO 99/54415 discloses an irradiation method using an optical fiber, and a method of irradiating a recording area (region where ink composition is ejected) with UV ray, which is obtained from a collimated radiation source via a mirror surface provided on the side of head unit. These irradiation methods may be applied to the invention.

Examples of the radiation ray for irradiation is not particularly limited, as long as the radiation ray can impart energy to the aforementioned compounds (b) and (c) with which the compounds can be decomposed, and are active radiation rays including X ray, ultraviolet ray, visible light, and electron beam. Among these, ultraviolet ray having a wavelength of 230 to 420 nm is preferable. As a light source, a polar or non-polar mercury lamp, metal halide lamp, xenon lamp, or a light-emitting diode having the above range of wavelength (UV-LED) may be used. In the case of using a UV-LED, plural diodes are used in such a manner that they are arranged in a straight line or in three dimensions, i.e., as a multi array, by means of energy power of the light-emitting chips.

It is also preferable in the invention that the ink composition is heated to a certain degree of temperature, and the time period from ejection to irradiation is 0.01 to 0.5 second, more preferably 0.01 to 0.3 second, and still more preferably 0.01 to 0.15 second. By controlling the time period from ejection to irradiation to be extremely short, the ejected ink can be prevented from bleeding before being cured. Also, exposure can be performed before the ink penetrates into the depth where the light cannot reach, even in the case of a porous recording medium, thus remaining of the unreacted monomers can be suppressed, thereby reducing odor. The inkjet recording method as described above and the ink composition according to the invention provides a synergic effect when used in combination. Particularly effective is use of the ink composition having an ink viscosity of 35 to 500 mP·s at 25° C. By using such a recording method, dot diameter of the ejected ink composition can be kept constant at any recording mediums of different surface compatibility, thus improving the image quality. For obtaining a color image, it is preferable that a color image having lower brightness precedes the one having higher brightness, in layering the color images. When a color image having a lower brightness is superimposed on the others, it becomes difficult for radiation ray to reach the ink in the lower part, and problems tend to occur, such as inhibition of curing sensitivity, increase in the amount of residual monomer, generation of odor, or deterioration in adhesiveness. Although irradiation may be performed on all of the color images at the same time, it is preferable to perform irradiation each time a color image is formed, from the viewpoint of facilitating the curing.

The inkjet recording apparatus to be used in the invention is not particularly limited, and any commercially available inkjet recording apparatuses can be used. That is, in the invention, by applying the ink composition of the invention onto a recording medium with an inkjet recording apparatus, an image can be recorded on the recording medium, in other words, a printed material can be obtained.

(Recording Medium)

Recording mediums, to which the ink composition according to the invention can be applied, are not particularly limited and include common papers such as non-coated and coated papers, various non-absorptive resin materials used in so-called soft packaging, and resin films formed from the non-absorptive resin materials into films; and examples of the various plastic films include a PET film, an OPS film, an OPP film, an ONy film, a PVC film, a PE film, a TAC film, and the like. Examples of the other plastics for use as the recording medium material include polycarbonate, acrylic resins, ABS, polyacetal, PVA, rubbers, and the like. In addition, metals and glasses are also usable as the recording medium.

The ink composition of the present invention is resistant to heat shrinkage during hardening and superior in adhesiveness to the base material (recording medium). Therefore, the ink composition of the present invention has an advantage of enabling formation of a high-definition image even on films that easily curl or deform due to shrinkage at the time of curing or heat during curing reaction, for example, thermally shrinkable films such as a PET film, an OPS film, an OPP film, a ONy film, and a PVC film.

[Planographic Printing Plate]

Use in a planographic printing plate is one of the favorable applications of the ink composition of the present invention. A method of producing a planographic printing plate includes the steps of ejecting the ink composition of the present invention on a hydrophilic substrate, and forming a hydrophobic image on the hydrophilic substrate by irradiating with a radiation ray to cure the ink composition. The planographic printing plate of the present invention is a planographic printing plate obtained by the method of producing a planographic printing plate of the present invention. When an ink and an aqueous component is supplied thereto, the aqueous component is held in the region exposed on the hydrophilic substrate while the ink is held in the hydrophobic region; and the recording medium can be used as it is in the printing step.

By ejecting the ink composition of the present invention on a hydrophilic substrate using a device such as an inkjet recording apparatus, and irradiating with a radiation ray to cure the ink, an imagewise hydrophobic ink-receiving area is formed on the hydrophilic substrate. When ink and an aqueous composition are supplied on the ink-receiving area, the aqueous component is retained in the region where the hydrophilic substrate is exposed, while the ink is retained in the hydrophobic image region, whereby a printing process can be directly carried out.

Because the ink composition according of the present invention exhibits superior curing sensitivity by irradiation, the planographic printing plate of the present invention utilizing the ink composition has an image area having excellent printing durability. In addition, it is possible to form a high-definition image area on the planographic printing plate directly from digital data utilizing an inkjet recording method.

The ink composition of the present invention described above may be used as is, as the ink composition used in production of a planographic printing plate.

[Substrate]

The substrate favorably used in preparation of the planographic printing plate of the present invention will now be described.

The substrate for use in preparation of the planographic printing plate according to the invention is not particularly limited, and may be any substrate as long as it is a dimensionally stable plate-shaped substrate. Any material may be directly used for the substrate, as long as it has a hydrophilic surface, or a plate-shaped substrate with a surface being subjected to a hydrophilizing treatment may also be used.

Examples of the materials for the substrate include papers, papers laminated with a plastic material (e.g., polyethylene, polypropylene, or polystyrene), metal plates (e.g., aluminum, zinc and copper), plastic films (e.g., cellulose diacetate, cellulose triacetate, cellulose propionate, cellulose butyrate, cellulose acetate, cellulose lactate, cellulose nitrate, polyethylene terephthalate, polyethylene, polystyrene, polypropylene, polycarbonate, and polyvinylacetal), papers or plastic films onto which the above-described metals are laminated or deposited, and the like. Preferable substrates include polyester film and aluminum plate. Among them, an aluminum plate, which is superior in dimensional stability and relatively low cost, is preferable.

Favorable aluminum plates are pure aluminum plates and alloy plates containing aluminum as the main component and a small amount of foreign elements, or may be a thin film of aluminum or aluminum alloy with a plastic film laminated thereon. The foreign elements contained in the aluminum alloy include silicon, iron, manganese, copper, magnesium, chromium, zinc, bismuth, nickel, and titanium. The content of the foreign element in the alloy is preferably 10 wt % or less. Although pure aluminum is most preferable in the invention, the aluminum plate may contain a small amount of foreign elements, because it is difficult to prepare completely pure aluminum due to problems in a refining process. The composition of the aluminum plate is not particularly limited, and any known raw and commonly used material may be used.

The thickness of the substrate is preferably 0.1 to 0.6 mm and more preferably 0.15 to 0.4 mm.

The aluminum plate is preferably subjected to a surface finishing treatment before use, such as surface-roughening treatment or anodizing treatment. Hydrophilicity of the recording medium and adhesion between the image-recording layer and the substrate are improved by performing surface finishing. Prior to the surface-roughening treatment, the aluminum plate is subjected to a degreasing treatment, for example, with a surfactant, organic solvent, aqueous alkaline solution, or the like, for removing rolling oil from the surface.

Various methods may be used for surface roughening of aluminum plate, and examples thereof include a mechanical surface-roughening treatment, an electrochemical surface-roughening treatment (a method of surface-roughening by electrochemically dissolving the surface), and chemical surface-roughening treatment (a method of surface-roughening by selectively dissolving the surface by a chemical treatment).

Any one of the methods known in the art such as ball polishing, brushing, blast polishing, and buffing may be used as a mechanical surface-roughening method. Alternatively, a method of transferring surface irregularity may be applied, using a surface-irregular roll during a process of hot rolling the aluminum.

The electrochemical surface-roughening may be performed, for example, by applying an alternate or direct current to the substrate in an electrolyte solution containing an acid such as hydrochloric acid or nitric acid. Yet alternatively, the method using a mixed acid described in JP-A No. 54-63902 may also be used.

The aluminum plate after surface-roughening treatment may be etched as needed by using an alkaline aqueous solution of, for example, potassium hydroxide or sodium hydroxide, and further, after neutralization, subjected to an anodizing process to improve abrasion resistance, if appropriate.

Various electrolytes that form a porous oxide film may be used as the electrolytes for anodizing an aluminum plate. Generally, sulfuric acid, hydrochloric acid, oxalic acid, chromic acid, or a mixed acid thereof is used. The concentration of the electrolyte is determined according to the kind of electrolyte as appropriate.

Conditions for the anodizing process vary according to the electrolyte used, and thus is not specified particularly; but generally, the electrolyte concentration is 1 to 80 wt %; liquid temperature is 5 to 70° C.; electric current density is 5 to 60 A/dm$^2$; voltage is 1 to 100 V; and the electrolysis period is from 10 seconds to 5 minutes. The amount of the anodic oxide film to be formed is preferably 1.0 to 5.0 g/m$^2$ and more preferably 1.5 to 4.0 g/m$^2$. Within the above range, it is possible to obtain a planographic printing plate favorable in printing durability and scuff resistance in the non-image area.

The surface-finished recording medium having an anodic oxide film described above may be used as the substrate for use in the present invention, but may also be subjected to other treatments as needed, for example, treatments for expanding or sealing of micropores in the anodic oxide film described in JP-A Nos. 2001-253181 and 2001-322365, or a surface hydrophilizing treatment performed by immersing the substrate in an aqueous solution containing a hydrophilic compound, for further improvement of adhesion to the upper layer, hydrophilicity, stain resistance, heat insulation efficiency, and others. The expanding and sealing treatments are not limited to the methods described above, and any known methods may be used.

(Sealing Treatment)

Sealing treatment may be performed by methods using an aqueous solution containing an inorganic fluorine compound, such as a treatment with fluorozirconic acid alone or sodium fluoride, vapor sealing in the presence of lithium chloride, or sealing with hot water.

Among the above methods, sealing treatments utilizing an aqueous solution containing an inorganic fluorine compound, water vapor, and hot-water are preferable.

[Hydrophilizing Treatment]

Hydrophilizing treatments for use in the present invention include an alkali metal silicate method described in U.S. Pat.

Nos. 2,714,066, 3,181,461, 3,280,734 and 3,902,734. In this method, the substrate is immersed and electrolyzed, for example, in an aqueous solution of sodium silicate. Also included are a method of treating the substrate with potassium fluorozirconate, described in JP-B No. 36-22063, and a method of treating with polyvinylphosphonic acid, described in U.S. Pat. Nos. 3,276,868, 4,153,461 and 4,689,272.

The substrate in the invention preferably has an average center-line roughness of 0.10 to 1.2 μm. Within this range, it is possible to obtain favorable adhesiveness to the recording medium, favorable printing durability, and favorable stain resistance.

Hereinafter, exemplary embodiments of the present invention will now be described.

1. An ink composition comprising:
    a cationically polymerizable compound;
    a compound that generates an acid when irradiated with a radiation ray; and
    an onium salt compound that generates an organic acid compound having a basic nitrogen atom when irradiated with a radiation ray, the onium salt compound being represented by any one of the following Formulae (I), (II) and (III):

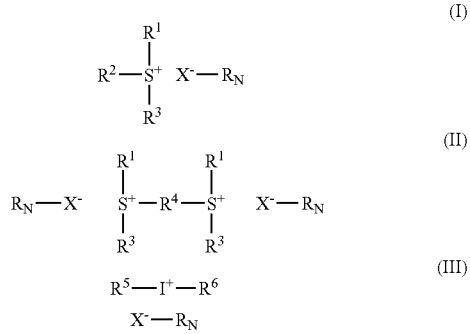

wherein, in the Formulae (I), (II) and (III), $R_N$ represents a monovalent organic group including a basic nitrogen atom or a monovalent organic group including an ammonium group; $R^1$ to $R^3$ and $R^5$ to $R^6$ each independently represent an alkyl, cycloalkyl, aralkyl, or aryl group; $R^4$ represents an alkylene, cycloalkylene, or arylene group; $X^-$ represents $CO-O^-$ or $SO_2-O^-$; and any two of $R^1$ to $R^3$ in Formula (I), any two of $R^1$ and $R^3$ in Formula (II), or $R^5$ and $R^6$ in Formula (III) may bond with each other to form a ring.

2. The ink composition according to 1, wherein when the onium salt compound is decomposed by irradiation of a radiation ray, an anion site, having a basic nitrogen atom and an organic acid site and represented by $[X^-—R_N]$ in the Formulae (I), (II) and (III), emits an acid whereby the onium salt compound becomes neutral.

3. The ink composition according to 1, wherein the radiation ray is an ultraviolet ray.

4. The ink composition according to 3, wherein the ultraviolet ray has a wavelength of 230 to 420 nm.

5. The ink composition according to 1, wherein the proportion of solid content of the onium salt compound to the total solid content of the ink composition is in the range of from 0.01 to 15% by weight.

6. The ink composition of 1, wherein the cationically polymerizable compound is at least one compound selected from the group consisting of epoxy compounds, vinyl ether compounds, and oxetane compounds.

7. The ink composition of 1, wherein the proportion of solid content of the cationically polymerizable compound to the total solid content of the ink composition is in the range of from 10 to 95% by weight.

8. The ink composition of 1, wherein the compound that generates an acid when irradiated with a radiation ray is represented by any one of the following Formulae (b1), (b2) and (b3):

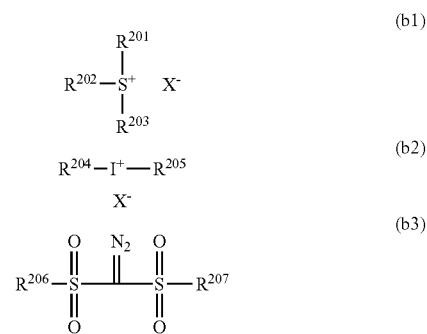

wherein, $R^{201}$, $R^{202}$ and $R^{203}$ in Formula (b1) each independently represent an organic group, $R^{204}$ to $R^{207}$ in Formula (b2) and (b3) each independently represent an aryl, alkyl or cycloalkyl group, and $X^-$ represents a non-nucleophilic anion.

9. The ink composition of 1, wherein the proportion of solid content of the compound that generates an acid when irradiated with a radiation ray to the total solid content of the ink composition is in the range of from 0.1 to 20% by weight.

10. The ink composition according to 1, wherein the ink composition further comprises a colorant.

11. The ink composition according to 10, wherein the colorant is a pigment or an oil-soluble dye.

12. The ink composition of 10, wherein the proportion of solid content of the colorant to the total solid content of the ink composition is in the range of from 1 to 20% by weight.

13. The ink composition according to 1, wherein the ink composition contains substantially no solvent.

14. The ink composition according to 1, wherein the ink composition further comprises a compound having a basic nitrogen atom.

15. The ink composition according to 1, wherein the viscosity of the ink composition is in the range of from 7 to 30 mPa·s at a temperature at which the ink is ejected.

16. The ink composition according to 1, wherein the ink composition is used in an inkjet recording method.

17. An inkjet recording method comprising:
    ejecting the ink composition according to 1 onto a recording medium; and
    curing the ejected ink composition by irradiation with a radiation ray.

18. A printed material that is recorded by the inkjet recording method according to 17.

19. A production method of a planographic printing plate comprising:
    ejecting the ink composition according to 1 onto a hydrophilic substrate; and curing the ejected ink composition by irradiation with a radiation ray to form a hydrophobic image composed of the cured ink composition on the hydrophilic substrate.

20. A planographic printing plate obtained by the production method of a planographic printing plate according to 19.

EXAMPLES

Hereinafter, the present invention will be described with reference to examples, but is not limited thereto.

Example 1

<Preparation of Pigment Dispersions>

Pigment dispersions of yellow, magenta, cyan and black, respectively, were prepared according to the method described hereinafter. The dispersion was prepared by performing dispersion with a known dispersing machine, under conditions adjusted such that an average diameter of pigment particles is in the range of 0.2 to 0.3 μm, and then filtering the mixture under heat.

(Yellow Pigment Dispersion 1)

| | |
|---|---|
| C.I. Pigment Yellow 12 | 10 parts by weight |
| Polymer dispersant (SOLSPERSE series product manufactured by ZENECA Inc.) | 5 parts by weight |
| Stearyl acrylate (Magenta pigment dispersion 1) | 85 parts by weight |
| C.I. Pigment Red 57:1 | 15 parts by weight |
| Polymer dispersant (SOLSPERSE series product manufactured by ZENECA Inc.) | 5 parts by weight |
| Stearyl acrylate (Cyan pigment dispersion 1) | 80 parts by weight |
| C.I. Pigment Blue 15:3 | 20 parts by weight |
| Polymer dispersant (SOLSPERSE series product manufactured by ZENECA Inc.) | 5 parts by weight |
| Stearyl acrylate (Black pigment dispersion 1) | 75 parts by weight |
| C.I. Pigment black 7 | 20 parts by weight |
| Polymer dispersant (SOLSPERSE series product manufactured by ZENECA Inc.) | 5 parts by weight |
| Stearyl acrylate | 75 parts by weight |

<Preparation of Ink>

Inks of yellow, magenta, cyan and black were prepared from the above dispersions 1 in accordance with the method as described below.

| | |
|---|---|
| (Yellow ink 1) | |
| Cationically polymerizable compound (a) | |
| CELOXIDE 2021 (epoxy compound: manufactured by DAICEL-UCB Co., Ltd.) | 35 g |
| OXT-221 (oxetane compound: manufactured by Toagosei Co., Ltd.) | 55 g |
| Photo-acid generator (b) | |
| Compounds (b-27)/(b-32): 1/2 | 5 g |
| Specific compound (c) | |
| Compound (c-27) | 1.5 g |
| Colorant (pigment dispersion above) | |
| Yellow pigment dispersion 1 | 5 g |
| (Magenta ink 1) | |
| Cationically polymerizable compound (a) | |
| CELOXIDE 2021 (epoxy compound: manufactured by DAICEL-UCB Co., Ltd.) | 35 g |
| OXT-221 (oxetane compound: manufactured by TOAGOSEI Co., Ltd.) | 55 g |

| | |
|---|---|
| -continued | |
| Photo-acid generator (b) | |
| Compound (b-3) | 5 g |
| Specific compound (c) | |
| Compound (c-1) | 1.5 g |
| Colorant (pigment dispersion above) | |
| Magenta pigment dispersion 1 | 5 g |
| (Cyan ink 1) | |
| Cationically polymerizable compound (a) | |
| CELOXIDE 2021 (epoxy compound: manufactured by DAICEL-UCB Co., Ltd.) | 35 g |
| OXT-221 (oxetane compound: manufactured by TOAGOSEI Co., Ltd.) | 55 g |
| Photo-acid generator (b) | |
| Compound (b-75) | 5 g |
| Specific compound (c) | |
| Compound (c-42) | 1.5 g |
| Colorant (pigment dispersion above) | |
| Cyan pigment dispersion 1 | 5 g |
| (Black ink 1) | |
| Cationically polymerizable compound (a) | |
| CELOXIDE 2021 (epoxy compound: manufactured by DAICEL-UCB Co., Ltd.) | 35 g |
| OXT-221 (oxetane compound: manufactured by TOAGOSEI Co., Ltd.) | 55 g |
| Photo-acid generator (b) | |
| Compound (b-10) | 5 g |
| Specific compound (c) | |
| Compound (c-17) | 1.5 g |
| Colorant (pigment dispersion above) | |
| Black pigment dispersion | 5 g |
| Sensitizer | |
| 9,10-Dimethoxyanthracene | 0.5 g |

<Inkjet Image Recording>

(Evaluation of Multicolor Image)

An image was recorded on a recording medium by using a commercially available inkjet recording apparatus equipped with a piezoelectric inkjet nozzle. The ink-supplying system is composed of an ink stock tank, a supply pipe, an ink-supplying tank positioned immediately anterior to an inkjet head, a filter, and a piezoelectric inkjet head. The region ranging from the ink-supplying tank to the inkjet head was insulated and heated. The temperature sensors were placed close to the ink-supplying tank and inkjet head nozzle, and the nozzle part is controlled so that the temperature is constantly in the range of 70° C.±2° C. The piezoelectric inkjet head was driven to eject multi-sized dots of from 8 to 30 pl at a resolution of 720×720 dpi. The exposure system, main scanning speed, and injection frequency were adjusted in such a manner that irradiation of a UV-A beam started 0.1 second after ejection of the ink onto the recording medium, in an focused manner with an exposed-face illuminance of 100 mW/cm². Exposure energy was irradiated at variable exposure time periods. The term "dpi" in the present invention means a number of dots per 2.54 cm.

The inks of respective colors were ejected at an environment temperature of 25° C. in order of black, cyan, magenta, and yellow. Each ink was irradiated with an ultraviolet beam after ejection, respectively. The irradiation was performed so that the total exposure energy for each color is equally 300 mJ/cm², under which the ink cured completely and the tackiness thereof was not felt by the finger. The image was recorded on recording mediums of a surface-roughened aluminum substrate, a transparent biaxially-stretched polypropylene film with the surface treated to be suitable for printing, a soft vinyl chloride sheet, a cast-coated paper, and a commercially available recycled paper. An image with a high resolution and no dot blurring was obtained in all cases of the recording medium. Even in the case of a bond paper, the ink was cured sufficiently and there was no penetration of the ink to the back face of the paper or generation of odor derived from unreacted monomer. In addition, the ink recorded on the film had sufficient flexibility and there was no crack when the film was bent, as well as that there was no problem in adhesiveness in a cellophane-tape peeling test.

Examples 2 to 13 and Comparative Examples 1 to 4

<Preparation of Ink>

(Magenta Ink 2 to 17)

| | |
|---|---|
| Cationically polymerizable compound (a) as described in Table 1 | 90 g |
| Photo-acid generator (b) as described in Table 1 | 5 g |
| Specific compound (c) as described in Table 1 | 1.5 g |
| Specific base composition as needed | (0.03 g) |
| Sensitizer as needed | (0.5 g) |
| Colorant (Magenta pigment dispersion 1) | 5 g |

Compositions used in Examples 2 to 13 (Magenta ink 2 to 13) and Comparative Examples 1 to 4 (Magenta ink 14 to 17) are shown in Table 1.

Details of the cationically polymerizable compound, organic acid compound and sensitizer shown in Table 1 are as follows:

Cationically Polymerizable Compound (1):
CELOXIDE 2021 (epoxy: manufactured by DAICEL-UCB Co., Ltd.)/OXT-221 (oxetane: manufactured by TOAGOSEI Co., Ltd.), 35/55 mixture Cationically Polymerizable Compound (2):
CELOXIDE 3000 (epoxy: manufactured by DAICEL-UCB Co., Ltd.)/OXT-211(oxetane: manufactured by TOAGOSEI Co., Ltd.), 50/40 mixture Cationically Polymerizable Compound (3):
Bisphenol A-diglycidyl ether/OXT-221 (oxetane, manufactured by TOAGOSEI Co., Ltd.), 40/50 mixture Cationically Polymerizable Compound (4):
CELOXIDE 2021 (epoxy: manufactured by DAICEL-UCB Co., Ltd.)/OXT-101(oxetane, manufactured by TOAGOSEI Co., Ltd.), 55/35 mixture Sensitizer (5)
9,10-Dimethoxyanthracene Sensitizer (6)
Pyrene In Comparative Example 1, the ink was prepared in the same manner except that Specific compound (c) was not added. In Comparative Example 2 to 4, 0.03 parts by weight of octylamine, triphenylsulfonium acetate, and sodium acetate were added as a base composition, respectively.

The ink viscosity of each ink composition obtained in Examples and Comparative Examples above at the ejection temperature was in the range of 7 to 20 mPs.

[Inkjet Image Recording]

(Evaluation of Mono-Color Image)

A magenta image was printed in a similar manner to Example 1 by using each of the magenta inks 2 to 17 prepared in accordance with the above method.

1. Evaluation of Inkjet Image

In accordance with the methods as described below, sensitivity for curing, penetrability into a commercially available recycled paper, ink bleeding on a surface-roughened aluminum substrate, adhesiveness, printing durability, and storage stability of each image were evaluated.

2. Evaluation of Curing Sensitivity

The amount of exposure energy (mJ/cm²) at which the surface of the image loses tackiness after UV irradiation was defined as curing sensitivity. A smaller value indicates a higher sensitivity.

3. Evaluation of Storage Stability

After the inks prepared were stored at 75% RH and 60° C. for three days, ink viscosity was determined at the ejection temperature, and increase in the ink viscosity was determined as viscosity ratio, i.e., viscosity after storage/viscosity before storage. The viscosity ratio being closer to 1.0 indicates a smaller change in viscosity and better storage stability, and the ink with the viscosity ratio exceeding 1.5 is not favorable since nozzle clogging may occur at the time of ejection.

4. Evaluation of Temporal Stability

Images were obtained by ejecting the ink on a surface-roughened aluminum substrate and a surface-treated transparent biaxially-stretched polypropylene film, and curing the ink by UV irradiation. The image was left for a week under conditions of fluorescent-lighted (300 Lux) and room temperature, then left for three days at 75% RH and 60° C., and thereafter adhesiveness was evaluated. The temporal stability was evaluated according to the degree of deterioration in adhesiveness, as indicated by the following criteria:

A: No temporal change in adhesiveness after recording of the image was observed

B: Peeling of the image was slightly observed

C: Significant deterioration in adhesiveness by peeling of the image was observed 5. Evaluation of Penetrability into Commercially Available Recycled Paper Images printed on a commercially available recycled paper were evaluated according to the following criteria:

A: Almost no penetration and no residual monomer odor

B: Penetration and residual monomer odor were slightly observed

C: Distinct penetration of ink to the back face side and strong residual monomer odor were observed 6. Evaluation of Ink Bleeding on Surface-Roughened Aluminum Recording Medium Images printed on a surface-roughened aluminum substrate were evaluated according to the following criteria:

A: No ink bleeding was observed in between the adjacent dots

B: Ink bleeding of dots was slightly observed

C: Distinct ink bleeding of dots and blurring of image were observed

7. Evaluation of Adhesiveness to Surface-Roughened Aluminum Recording Medium

Two samples were prepared by printing an image of a surface roughened aluminum substrate, wherein one sample had no cut on the image, while the other sample had 11 cuts each in longitudinal and lateral directions at an interval of 1 mm to form 100 squares of 1 mm×1 mm, according to JIS K 5400. A cellophane tape was attached on the image and peeled rapidly at an angle of 90 degrees. The images or the squares that remained unpeeled were evaluated according to the following criteria:

A: No peeling of the image was observed even in the cross-cut image

B: Peeling of ink was slightly observed in the cross-cut image, but no peeling was observed in the image without cuts C: Easy peeling of the image was observed in both samples (Evaluation of Planographic Printing Plate)

An image was formed on the surface-roughened aluminum recording medium prepared in accordance with the abovementioned method, using the ink composition of the present invention. The recording medium was evaluated as a planographic printing plate.

a. Evaluation of Image

Printing was performed by placing the planographic printing plate prepared using the ink composition of the present invention into a Heidel KOR-D printing machine, and supplying an ink [VALUES-G Red, for sheet-fed printing (manufactured by DAINIPPON INK and Chemicals, Inc.)] and a dampening water [ECOLITY 2 (manufactured by FUJI FILM CORPORATION)]. The image after printing 100 sheets was visually evaluated according to the following criteria.

A: No whitening in the image region or no staining in non-image region was observed B: Whitening in image region and/or staining in non-image region were slightly observed.

C: Whitening in image region and/or staining in non-image region were observed, which were problematic in practical use b. Evaluation of Printing Durability Printing was continued, and the number of sheets which could be printed was determined as the indicator of printing durability. The number of sheets was relatively compared, where the result in Comparative Example 1 was determined as 100. A greater value indicates a better printing durability.

The evaluation results are summarized in Table 1.

TABLE 1

| | | Example 2 | Example 3 | Example 4 | Example 5 | Example 6 | Example 7 | Example 8 | Example 9 | Example 10 |
|---|---|---|---|---|---|---|---|---|---|---|
| Ink composition | (a) Cationically polymerizable compound | (1) | (1) | (1) | (2) | (2) | (2) | (3) | (3) | (3) |
| | (b) Photochemical acid generator | b-3 | b-5 | b-29 | b-40 | b-59 | b-74 | b-12 | b-24 | b-80 |
| | (c) Specific compound | c-1 | c-34 | c-23 | c-9 | c-31 | c-41 | c-17 | c-20 | c-11 |
| | Specific base compound | none | none | X-5 | none | XII-12 | none | XI-3 | none | none |
| | Sensitizer | none | none | (5) | none | (6) | none | none | (5) | none |
| Evaluation | Penetrability into recycled paper | A | A | A | A | A | B | A | A | A |
| | Ink bleeding on aluminum support | A | B | A | A | A | A | A | B | A |
| | Adhesiveness to aluminum support | A | A | A | A | A | A | A | A | A |
| | Temporal change in adhesiveness | A | A | A | A | A | A | A | A | A |
| | Curing sensitivity (mJ/cm$^2$) | 280 | 300 | 320 | 300 | 310 | 320 | 350 | 260 | 300 |
| | Ink storage stability | 1.2 | 1.2 | 1.1 | 1.2 | 1.1 | 1.2 | 1.1 | 1.2 | 1.2 |
| | Image formed on planographic printing plate | A | A | A | A | A | A | A | A | A |
| | Printing durability | 120 | 130 | 130 | 110 | 120 | 120 | 130 | 120 | 110 |

| | | Example 11 | Example 12 | Example 13 | Comparative Example 1 | Comparative Example 2 | Comparative Example 3 | Comparative Example 4 |
|---|---|---|---|---|---|---|---|---|
| Ink composition | (a) Cationically polymerizable compound | (4) | (4) | (4) | (4) | (4) | (4) | (4) |
| | (b) Photochemical acid generator | b-82 | b-39 | b-3 | b-3 | b-3 | b-3 | b-3 |
| | (c) Specific compound | c-16 | c-9 | c-27 | none | octylamine* | TPS-1* | sodium acetate* |
| | Specific base compound | XIII-5 | none | none | none | none | none | none |
| | Sensitizer | (6) | none | none | none | none | none | none |
| Evaluation | Penetrability into recycled paper | A | B | A | B | B | B | B |
| | Ink bleeding on | A | A | A | B | B | A | A |

TABLE 1-continued

|  | | | | | | | |
|---|---|---|---|---|---|---|---|
| aluminum support Adhesiveness to aluminum support | A | A | A | A | A | B | B |
| Temporal change in adhesiveness | A | A | A | A | A | A | B |
| Curing sensitivity (mJ/cm$^2$) | 300 | 350 | 320 | 400 | 500 | 370 | 420 |
| Ink storage stability | 1.1 | 1.2 | 1.2 | 1.8 | 1.3 | 1.4 | 1.5 |
| Image formed on planographic printing plate | A | A | A | A | A | A | A |
| Printing durability | 120 | 110 | 120 | 100 | 90 | 100 | 100 |

*Used in place of Specific compound (c). TPS-1: triphenylsulfonium acetate

As apparent from Table 1, the ink composition of the present invention is cured with high sensitivity when irradiated with a radiation ray, capable of forming a high-quality image on a paper, and has favorable storage stability and ejection properties. Thus, the ink of the present invention satisfies curing sensitivity, resistance to ink bleeding on a non-penetrable substrate, and storage stability of the ink, in a balanced way.

On the other hand, the ink composition of Comparative Example 1, not containing the specific compound (c), was inferior in storage stability, and also slightly inferior in terms of penetrability into a recycled paper, ink bleeding on an aluminum substrate, and curing sensitivity. Alternatively, in the ink composition of Comparative Example 2 that contains a comparative basic compound in place of the specific compound (c), i.e., octylamine that does not generate an organic acid compound having a basic nitrogen atom, storage stability was improved but curing sensitivity was drastically deteriorated. In the ink composition of Comparative Example 3 containing a photo base that does not contain a basic nitrogen atom and generates a weak acid, in place of the specific compound (c), degradation of curing sensitivity was slightly improved, but storage stability was slightly low. In the ink composition of Comparative Example 4 containing sodium acetate as a non-photoactivatable salt, storage stability was not so much improved and curing sensitivity was degraded.

In addition, the planographic printing plate carrying an image formed with the ink composition of the present invention was capable of forming high-quality images and was also superior in printing durability.

As mentioned above, the present invention provides an ink composition that cures with high sensitivity when irradiated with a radiation ray to form a high quality image, and is superior in adhesiveness onto a recording medium, storage stability and ejection properties. The present invention also provides an inkjet recording method using the ink composition of the present invention.

The ink composition of the present invention, when used in ordinary printing processes, forms an image that is high in quality and strength to provide a high quality printed material. The ink composition is also favorably used in production of resists, color filters, and optical disks, and is further useful as an optical modeling material.

Furthermore, the ink composition of the present invention cures with high sensitivity even on a non-absorptive recording medium, and is capable of directly forming an image region being high in strength, based on digital data. Accordingly, the ink composition of the present invention can be favorably used for preparation of a planographic printing plate, in particular a planographic printing plate having a size of A2 or larger, and provides a planographic printing plate superior in printing durability.

The present invention provides an ink composition, being cationically polymerizable, that can prevent degradation of image quality or a substrate of a printed material or a planographic printing plate formed by using the ink composition of the present invention, and an inkjet recording method using the ink composition of the present invention.

According to the inkjet recording method of the present invention, a high quality image that cures with high sensitivity when irradiated with a radiation ray can be formed.

Additionally, the present invention provides a printed material, a planographic printing plate and a production method thereof, by using the ink composition of the present invention that is superior in storage stability and capable of curing with high sensitivity when irradiated with a UV ray.

The printed material, produced by using the ink composition that is superior in storage stability and capable of curing with high sensitivity when irradiated with a UV ray, is superior in strength in the image region, and capable of avoid temporal degradation of image quality or a substrate. In a similar manner, by using the ink composition of the present invention, a planographic printing plate with high printing durability and high image quality can be prepared according to digital data.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink composition comprising:
a cationically polymerizable compound;
a compound that generates an acid when irradiated with a radiation ray; and
an onium salt compound that generates an organic acid compound having a basic nitrogen atom when irradiated with a radiation ray, the onium salt compound being represented by any one of the following Formulae (I), (II) and (III):

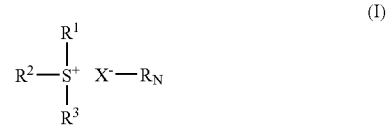

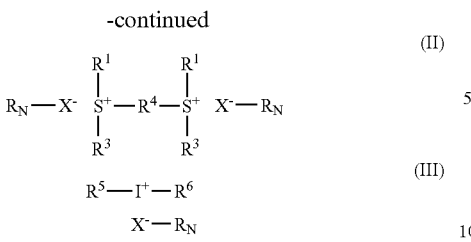

(II)

(III)

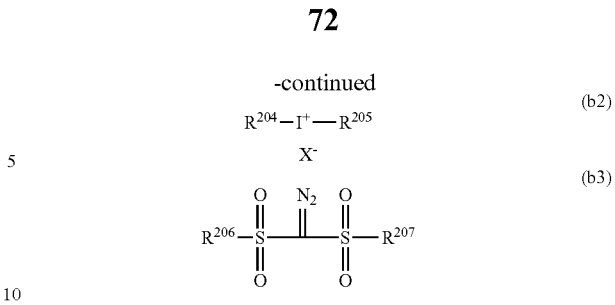

(b2)

(b3)

wherein, in the Formulae (I), (II) and (III), $R_N$ represents a monovalent organic group including a basic nitrogen atom or a monovalent organic group including an ammonium group; $R^1$ to $R^3$ and $R^5$ to $R^6$ each independently represent an alkyl, cycloalkyl, aralkyl, or aryl group; $R^4$ represents an alkylene, cycloalkylene, or arylene group; $X^-$ represents $CO-O^-$ or $SO_2-O^-$; and any two of $R^1$ to $R^3$ in Formula (I), any two of $R^1$ and $R^3$ in Formula (II), or $R^5$ and $R^6$ in Formula (III) may bond with each other to form a ring.

2. The ink composition according to claim 1, wherein when the onium salt compound is decomposed by irradiation of a radiation ray, an anion site, having a basic nitrogen atom and an organic acid site and represented by $[X-R_N]$ in the Formulae (I), (II) and (III), emits an acid whereby the onium salt compound becomes neutral.

3. The ink composition according to claim 1, wherein the radiation ray is an ultraviolet ray.

4. The ink composition according to claim 3, wherein the ultraviolet ray has a wavelength of 230 to 420 nm.

5. The ink composition according to claim 1, wherein the proportion of solid content of the onium salt compound to the total solid content of the ink composition is in the range of from 0.01 to 15% by weight.

6. The ink composition of claim 1, wherein the cationically polymerizable compound is at least one compound selected from the group consisting of epoxy compounds, vinyl ether compounds, and oxetane compounds.

7. The ink composition of claim 1, wherein the proportion of solid content of the cationically polymerizable compound to the total solid content of the ink composition is in the range of from 10 to 95% by weight.

8. The ink composition of claim 1, wherein the compound that generates an acid when irradiated with a radiation ray is represented by any one of the following Formulae (b1), (b2) and (b3):

(b1)

wherein, $R^{201}$, $R^{202}$ and $R^{203}$ in Formula (b1) each independently represent an organic group, $R^{204}$ to $R^{207}$ in Formula (b2) and (b3) each independently represent an aryl, alkyl or cycloalkyl group, and $X^-$ represents a non-nucleophilic anion.

9. The ink composition of claim 1, wherein the proportion of solid content of the compound that generates an acid when irradiated with a radiation ray to the total solid content of the ink composition is in the range of from 0.1 to 20% by weight.

10. The ink composition according to claim 1, wherein the ink composition further comprises a colorant.

11. The ink composition according to claim 10, wherein the colorant is a pigment or an oil-soluble dye.

12. The ink composition of claim 10, wherein the proportion of solid content of the colorant to the total solid content of the ink composition is in the range of from 1 to 20% by weight.

13. The ink composition according to claim 1, wherein the ink composition contains substantially no solvent.

14. The ink composition according to claim 1, wherein the ink composition further comprises a compound having a basic nitrogen atom.

15. The ink composition according to claim 1, wherein the viscosity of the ink composition is in the range of from 7 to 30 mPa·s at a temperature at which the ink is ejected.

16. An inkjet recording ink composition comprising the ink composition according to claim 1.

17. An inkjet recording method comprising:
   ejecting the ink composition according to claim 1 onto a recording medium; and
   curing the ejected ink composition by irradiation with a radiation ray.

18. A printed material that is recorded by the inkjet recording method according to claim 17.

19. A production method of a planographic printing plate comprising:
   ejecting the ink composition according to claim 1 onto a hydrophilic substrate; and
   curing the ejected ink composition by irradiation with a radiation ray to form a hydrophobic image composed of the cured ink composition on the hydrophilic substrate.

20. A planographic printing plate obtained by the production method of a planographic printing plate according to claim 19.

* * * * *